(12) United States Patent
Iwase et al.

(10) Patent No.: US 12,482,267 B2
(45) Date of Patent: Nov. 25, 2025

(54) AUTOMATIC TRAVEL SYSTEM FOR WORK VEHICLE

(71) Applicant: Yanmar Power Technology Co., Ltd., Osaka (JP)

(72) Inventors: Takuyua Iwase, Osaka (JP); Shiro Sugita, Osaka (JP); Shinya Nishibeppu, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 409 days.

(21) Appl. No.: 17/625,810

(22) PCT Filed: Jul. 9, 2020

(86) PCT No.: PCT/JP2020/026932
§ 371 (c)(1),
(2) Date: Sep. 6, 2022

(87) PCT Pub. No.: WO2021/006322
PCT Pub. Date: Jan. 14, 2021

(65) Prior Publication Data
US 2023/0221728 A1    Jul. 13, 2023

(30) Foreign Application Priority Data
Jul. 10, 2019    (JP) .................. 2019-128308

(51) Int. Cl.
*G06V 20/56* (2022.01)
*A01B 69/04* (2006.01)

(52) U.S. Cl.
CPC ............ *G06V 20/56* (2022.01); *A01B 69/008* (2013.01)

(58) Field of Classification Search
CPC .. G05D 1/0238; G05D 1/0088; G05D 1/0246; G05D 1/0257; A01B 69/008; A01B 69/001; A01B 69/00; G06V 20/56
See application file for complete search history.

(56) References Cited

U.S. PATENT DOCUMENTS

| 2007/0058838 A1 | 3/2007 | Taniguchi |
| 2012/0083982 A1 | 4/2012 | Bonefas et al. |
| 2018/0314261 A1 | 11/2018 | Arandorenko et al. |

(Continued)

FOREIGN PATENT DOCUMENTS

| JP | 2007078476 A | 3/2007 |
| JP | 2015-094994 A | 5/2015 |

(Continued)

*Primary Examiner* — Donald J Wallace
(74) *Attorney, Agent, or Firm* — Chris Mizumoto

(57) ABSTRACT

An automatic travel system for a work vehicle has an automatic travel control unit that causes a work vehicle, which is provided with an obstacle detection unit that detects obstacles, to travel automatically. The obstacle detection unit includes imaging units and active sensors. When the obstacle detection unit detects an obstacle based on information from the imaging units, and the separation distance from the obstacle is acquired based on information from the active sensors, the automatic travel control unit executes a first collision avoidance control for avoiding a collision between the work vehicle and the obstacle, on the basis of the separation distance from the obstacle acquired based on the information from the active sensors.

3 Claims, 18 Drawing Sheets

(56) References Cited

U.S. PATENT DOCUMENTS

2019/0025404 A1\* 1/2019 Farmer ..................... G01S 7/40
2019/0196481 A1\* 6/2019 Tay ...................... G05D 1/0246

FOREIGN PATENT DOCUMENTS

| JP | 2016024685 A | | 2/2016 |
|----|--------------|---|--------|
| JP | 2018-120421 | \* | 8/2018 |
| JP | 2018120421 A | | 8/2018 |

\* cited by examiner

AUTOMATIC TRAVEL SYSTEM FOR WORK VEHICLE

CROSS-REFERENCE

This application is a US National Stage Application under 35 U.S.C. § 371 of International Application No. PCT/JP2020/026932 filed Jul. 9, 2020, which claims foreign priority of JP2019-128308 filed Jul. 10, 2019, the disclosures of which are hereby incorporated by reference in their entirety.

TECHNICAL FIELD

The present invention relates to an automatic travel system for a work vehicle that enables automatic travel of the work vehicle.

BACKGROUND ART

A work vehicle that is equipped with a peripheral monitoring device that monitors the surroundings of the work vehicle has been available (for example, see Patent Literature 1). The peripheral monitoring device includes: a plurality of obstacle detection sensors, each of which detects an obstacle present in surroundings of the work vehicle and acquires a relative position of the obstacle; a plurality of cameras, each of which acquires an image of the surroundings of the work vehicle; a bird's eye view image acquisition unit that acquires a bird's eye view image of the surroundings of the work vehicle on the basis of the plurality of the images acquired by the plurality of the cameras; a warning area setting unit that sets a warning area where it is necessary to warn a driver about the presence of an obstacle; and a warning unit that warns the driver about the presence of an obstacle in the case where the relative position of the obstacle is within the warning area in the bird's eye view image.

CITATION LIST

Patent Literature

Patent Literature 1: International Publication No. 2012/169361

DISCLOSURE OF INVENTION

Problems to be Solved by the Invention

In the peripheral monitoring device disclosed in Patent Literature 1 described above, a radar device with low object discrimination accuracy is adopted as the obstacle detection sensor. Accordingly, when tall grass grows in the above-described warning area or when dust, powdery dust, or the like is stirred up as a floating matter in the warning area, the obstacle detection sensor may erroneously detect such tall grass or floating matter as an obstacle. When such erroneous detection occurs, the warning unit warns the driver about the presence of an obstacle in the warning area regardless of the presence of an obstacle that hinders travel of the work vehicle.

In the case where such a peripheral monitoring device is installed in a work vehicle capable of automatic driving, if tall grass grows in the warning area or if dust, powdery dust, or the like is stirred up as floating matters in the warning area, the peripheral monitoring device causes the work vehicle during automatic travel to perform unnecessary collision avoidance operations such as stopping as a result of erroneously detecting the floating matters as an obstacle.

In view of such reality, a principal subject of the present invention is to provide an automatic travel system for a work vehicle that can accurately detect an obstacle and avoid a collision between the work vehicle and the obstacle without the work vehicle having to perform unnecessary collision avoidance operations.

Means for Solving the Problems

A first characteristic configuration of the present invention is, in an automatic travel system for a work vehicle including: an automatic travel control unit that causes the work vehicle to automatically travel, the work vehicle including an obstacle detection unit that detects obstacles, wherein, the obstacle detection unit includes an imaging unit that image-captures a set range in a predetermined direction from the work vehicle, and an active sensor that measures a set range in the same predetermined direction as the imaging unit from the work vehicle; when the obstacle detection unit detects the obstacle from the information of the imaging unit and acquires a separation distance from the obstacle from the information of the active sensor, the automatic travel control unit executes first collision avoidance control to avoid a collision between the work vehicle and the obstacle on the basis of the separation distance from the obstacle acquired from the information of the active sensor.

According to this configuration, the obstacle can be detected accurately, and a collision between the work vehicle and the obstacle can be avoided without an unnecessary collision avoidance operation.

DESCRIPTION OF EMBODIMENTS

A description will hereinafter be made on, as an example of a mode for carrying out the present invention, an embodiment in which an automatic travel system for a work vehicle according to the present invention is applied to a tractor, which is an example of a work vehicle, with reference to the drawings. The automatic travel system for a work vehicle according to the present invention can be applied to, in addition to a tractor, manned work vehicles, such as a manned mower, a manned rice transplanter, a combine, a carrier, a snowplow, and a wheel loader, and unmanned work vehicles, such as an unmanned mower.

As illustrated in FIGS. 1 to 4, in a tractor 1 that is exemplified in the present embodiment, a rotary tiller 3, which is an example of a work device, is coupled in liftable and rollable manners to a rear portion of the tractor 1 via a three-point link mechanism 2. In this way, the tractor 1 is configured to have a rotary tillage specification. The tractor 1 can travel automatically in a field A, which is illustrated in FIG. 5 and an example of a work site, or the like by using an automatic travel system for the work vehicle. Instead of the rotary tiller 3, any of various work devices such as a plow, a disc harrow, a cultivator, a subsoiler, a seeder, a spraying device, and a mowing device can be coupled to the rear portion of the tractor 1.

Figure 6:
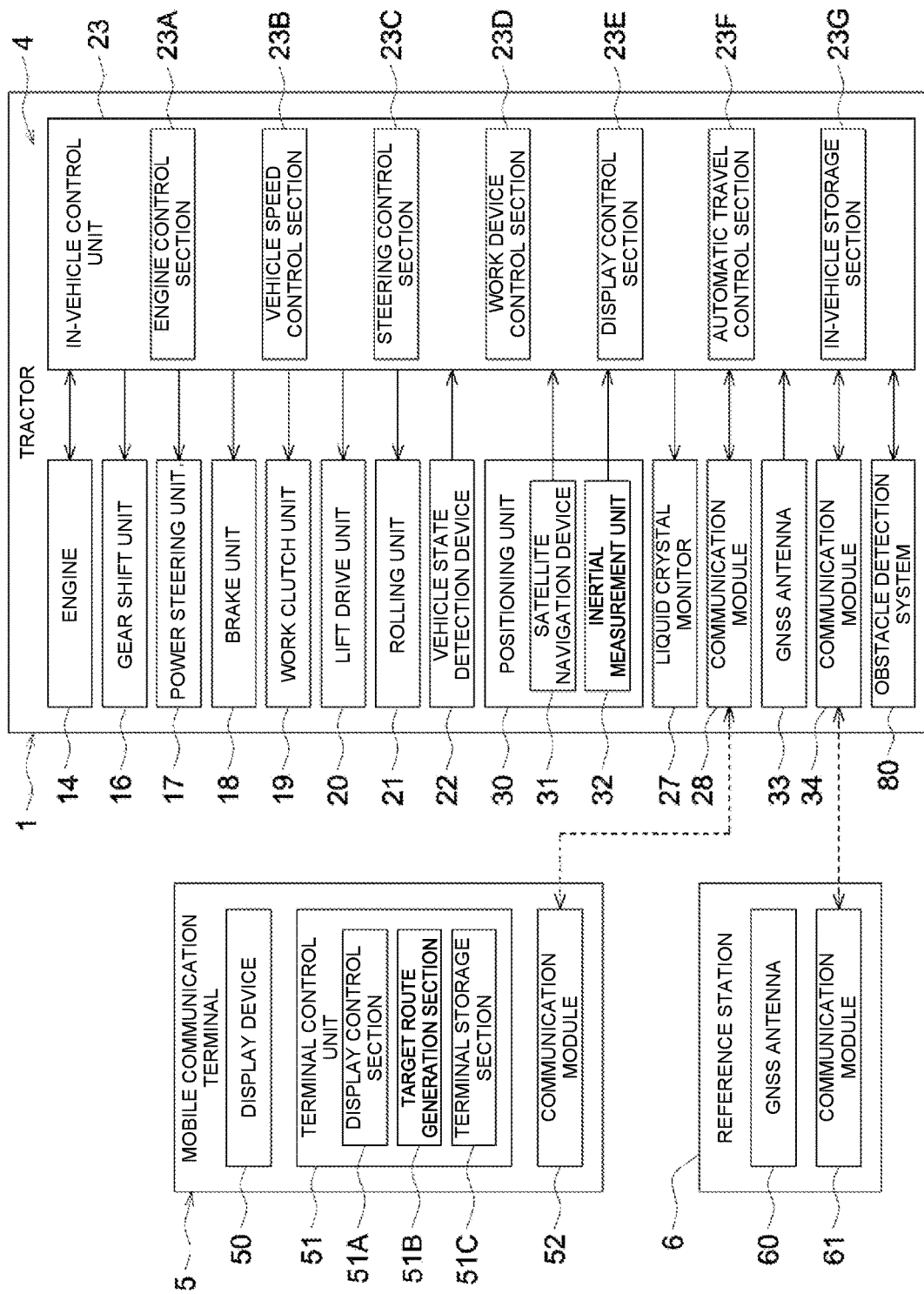
FIG. 6 is a block diagram illustrating the schematic configuration of an automatic travel system for a work vehicle.

As illustrated in FIG. 6, the automatic travel system includes: an automatic travel unit 4 that is mounted on the tractor 1; and a mobile communication terminal 5 as an example of a wireless communication device that is set to communicate wirelessly with the automatic travel unit 4. The mobile communication terminal 5 includes a multi-touch type display device (for example, a liquid crystal panel) 50 that allows various information displays, input operations, and the like related to automatic travel. A tablet-type personal computer, a smartphone, or the like can be adopted as the mobile communication terminal 5. For the wireless communication, wireless local area network (LAN) such as Wi-Fi®, short-range wireless communication such as Bluetooth®, or the like can be adopted.

As illustrated in FIGS. 1 to 3 and FIG. 6, the tractor 1 includes: left and right drivable and steerable front wheels 10; left and right drivable rear wheels 11; a cabin 13 that forms a boarding-type driving unit 12; an electronically controlled diesel engine (hereinafter referred to as engine) 14 having a common rail system; a hood 15 that covers the engine 14, etc.; a gear shift unit 16 that shifts power from the engine 14; a full hydraulic power steering unit 17 that steers the left and right front wheels 10; a brake unit 18 that brakes the left and right rear wheels 11; a work clutch unit 19 of an electronic hydraulic control type that interrupts transmission to the rotary tiller 3; a lift drive unit 20 of an electronic hydraulic control type that drives the rotary tiller 3 up and down; a rolling unit 21 of an electronic hydraulic control type that drives the rotary tiller 3 in a roll direction; a vehicle state detection device 22 that includes various sensors, switches, and the like to detect various setting states, operation states of units in the tractor 1; and an in-vehicle control unit 23 that has various control sections. An electronically controlled gasoline engine having an electronic governor may be adopted as the engine 14. The power steering unit 17 may be of an electric type including an electric motor for steering.

Figure 1:
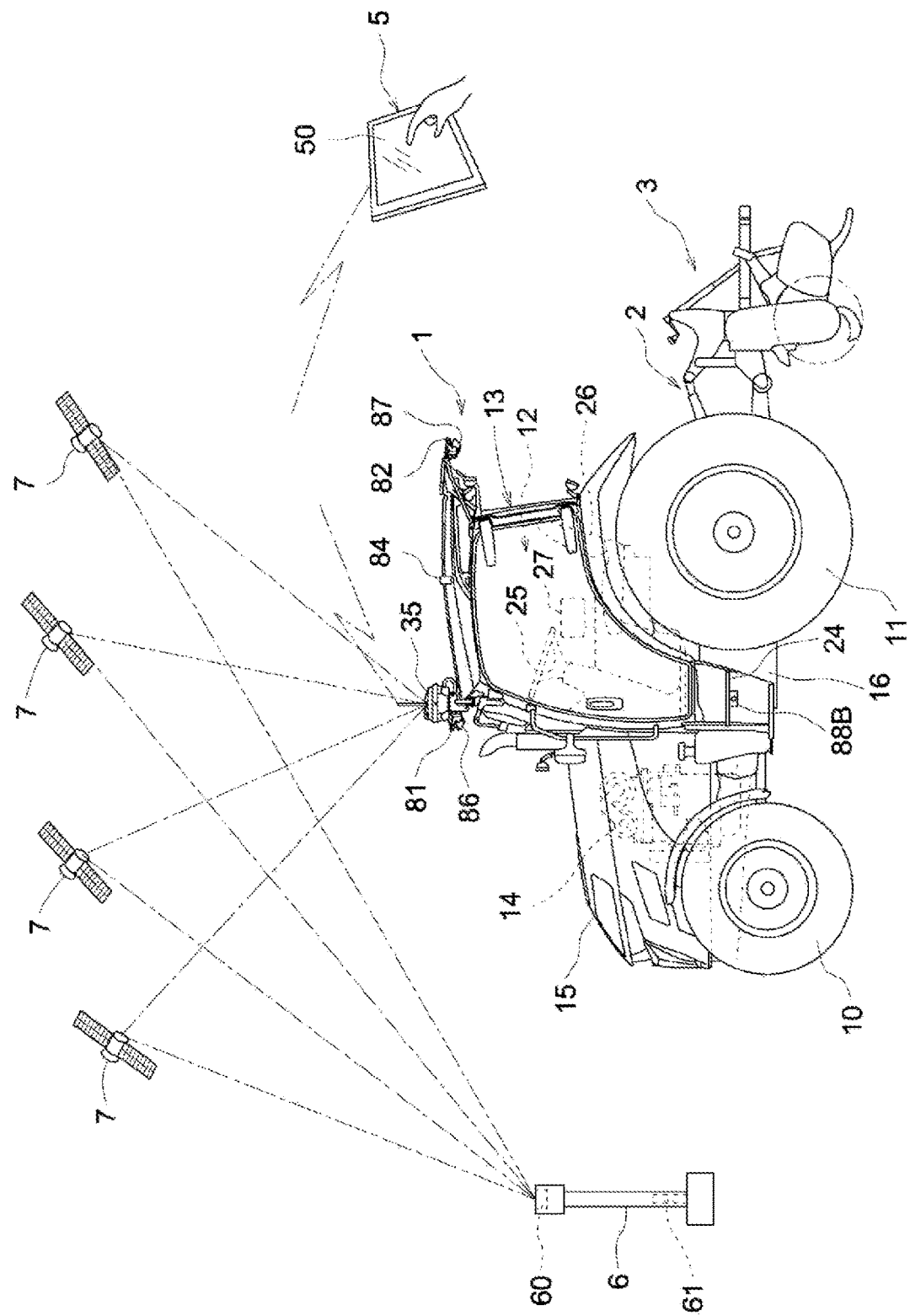
FIG. 1 is a diagram illustrating the schematic configuration of an automatic travel system for a work vehicle.
Figure 3:
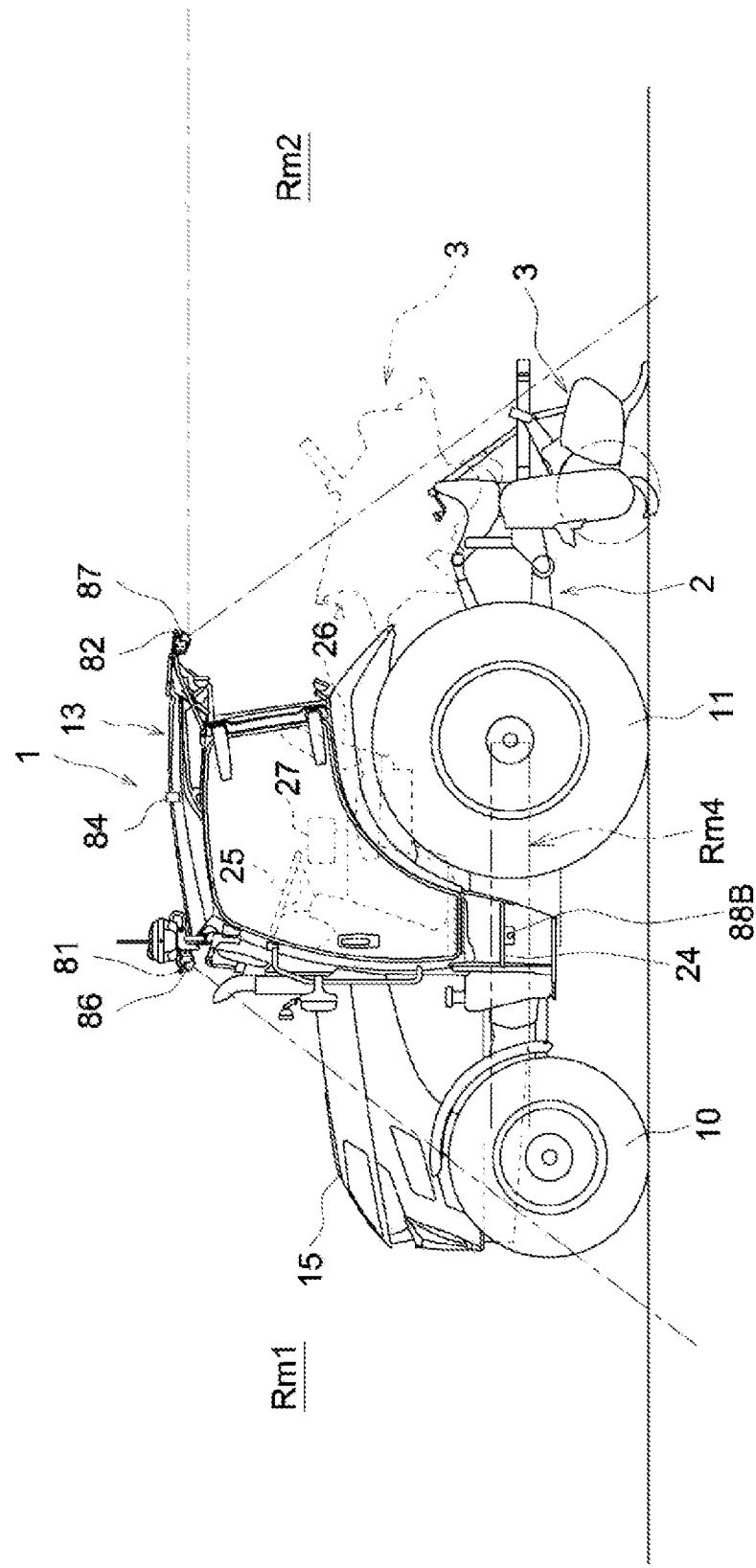
FIG. 3 is a side view of the tractor showing measurement ranges of LiDAR sensors and sonar.

As illustrated in FIGS. 1 and 3, the driving unit 12 includes: a steering wheel 25 for manual steering; a seat 26 for an occupant; and a multi-touch type liquid crystal monitor 27 that allows the various information displays, the input operations, and the like. Although not illustrated, the driving unit 12 includes operation levers, such as an accelerator lever and a gear shift lever, and operation pedals, such as an accelerator pedal and a clutch pedal.

Although not illustrated, the gear shift unit 16 includes: an electronically controlled continuously variable transmission that shifts the power from the engine 14; and a forward-reverse switching device of an electronic hydraulic control type for switching the power, which has been shifted by the continuously variable transmission, between forward and reverse. An integrated hydro-static mechanical transmission (I-HMT) is adopted as the continuously variable transmission. The I-HMT is an example of a hydraulic mechanical continuously variable transmission that has higher transmission efficiency than that of a hydro-static transmission (HST). The forward-reverse switching device includes: a hydraulic clutch for interrupting forward power; a hydraulic clutch for interrupting reverse power; and an electromagnetic valve that controls a flow of oil to these clutches. Instead of the I-HMT, a hydraulic mechanical transmission (HMT) as an example of the hydraulic mechanical continuously variable transmission, the hydro-static transmission, a belt-type continuously variable transmission, or the like may be adopted as the continuously variable transmission. Alternatively, instead of the continuously variable transmission, the gear shift unit 16 may include a stepped transmission of an electronic hydraulic control type that has: a plurality of hydraulic clutches for gear shifting; and a plurality of electromagnetic valves for controlling the flow of the oil to the clutches.

Although not illustrated, the brake unit 18 includes: left and right brakes that brake the left and right rear wheels 11, respectively; a foot brake system that actuates the left and right brakes in an interlocking manner with depressing operations of left and right brake pedals provided in the driving unit 12; a parking brake system that actuates the left and right brakes in an interlocking manner with an operation of a parking lever provided in the driving unit 12; and a turning brake system that actuates the brake on an inner side of a turn in an interlocking manner with steering of the left and right front wheels 10 at a set angle or larger.

Figure 7:
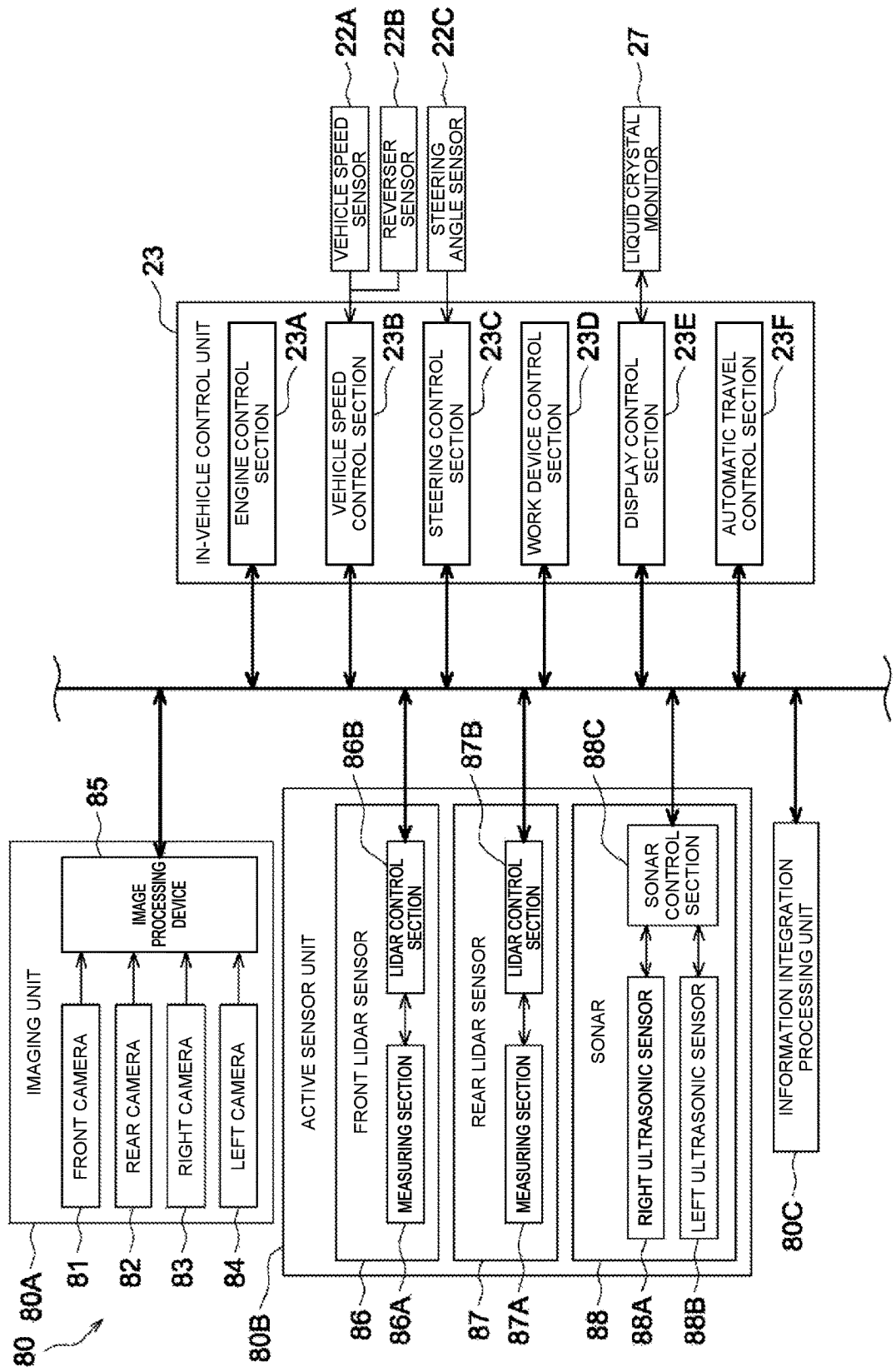
FIG. 7 is a block diagram illustrating the schematic configuration of an obstacle detection unit for a work vehicle.

The vehicle state detection device 22 is a general term for various sensors and switches provided in sections of the tractor 1. As illustrated in FIG. 7, the vehicle state detection device 22 includes: a vehicle speed sensor 22A that detects a vehicle speed of the tractor 1; a reverser sensor 22B that detects an operation position of a reverser lever for forward-reverse switching; and a steering angle sensor 22C that detects steering angles of the front wheels 10. Although not illustrated, the vehicle state detection device 22 also includes: a rotation sensor that detects an output rotation speed of the engine 14; an accelerator sensor that detects the operation position of the accelerator lever; and a gear shift sensor that detects an operation position of the gear shift lever.

As illustrated in FIGS. 6 to 7, the in-vehicle control unit 23 includes: an engine control section 23A that executes control related to the engine 14; a vehicle speed control section 23B that executes control related to the vehicle speed and the forward-reverse switching of the tractor 1; a steering control section 23C that executes control related to steering; a work device control section 23D that executes control related to the work device such as the rotary tiller 3; a display control section 23E that executes control related to the display and notification to the liquid crystal monitor 27 and the like; an automatic travel control section 23F that executes control related to the automatic travel; and a non-volatile in-vehicle storage section 23G that stores a target route P (see FIG. 5) for the automatic travel generated in accordance with a travel area sectioned in the field. Each of the control sections 23A to 23F is constructed of an electronic control unit, in which a microcontroller or the like is integrated, various control programs, and the like. The control sections 23A to 23F are connected in a mutually communicable manner via a controller area network (CAN). For example, in-vehicle ethernet, CAN with flexible data rate (CAN-FD), or the like that is a communication standard other than the CAN or a next-generation communication standard may be adopted for the mutual communication among the control sections 23A to 23F.

The engine control section 23A executes engine speed maintenance control and the like on the basis of detection information from the accelerator sensor and detection information from the rotation sensor. In the engine speed maintenance control, the engine speed is maintained at a speed that corresponds to the operation position of the accelerator lever.

The vehicle speed control section 23B executes vehicle speed control, forward-reverse switching control, and the like on the basis of detection information from the gear shift sensor, detection information from the vehicle speed sensor 22A, and the like. In the vehicle speed control, the actuation of the continuously variable transmission is controlled such that the vehicle speed of the tractor 1 is changed to a speed corresponding to the operation position of the gear shift lever. In the forward-reverse switching control, a transmission state of the forward-reverse switching device is switched on the basis of detection information from the reverser sensor 22B. The vehicle speed control includes deceleration stop processing for decelerating the continuously variable transmission to a zero-speed state so as to stop travel of the tractor 1 in the case where the gear shift lever is operated to a zero-speed position.

The work device control section 23D executes: work clutch control for controlling actuation of the work clutch unit 19 on the basis of an operation of a PTO switch and the like; lift control for controlling actuation of the lift drive unit 20 on the basis of an operation of a lift switch, a set value of a height setting dial, and the like; and rolling control for controlling actuation of the rolling unit 21 on the basis of a set value of a roll angle setting dial, and the like. The PTO switch, the lift switch, the height setting dial, and the roll angle setting dial are included in the vehicle state detection device 22.

As illustrated in FIG. 6, the tractor 1 includes a positioning unit 30 that measures a current position, a current orientation, and the like of the tractor 1. The positioning unit 30 has: a satellite navigation device 31 that measures the current position and the current orientation of the tractor 1 by using a global navigation satellite system (GNSS) as an example of a navigation satellite system; an inertial measurement unit (IMU) 32 that has a three-axis gyroscope, a three-direction acceleration sensor, and the like to measure a posture, a direction, and the like of the tractor 1; and the like. As positioning methods using the GNSS, differential GNSS (DGNSS), real time kinematic GNSS (RTK-GNSS), and the like are available. In the present embodiment, the RTK-GNSS, which is suited for positioning of a moving body, is adopted. Accordingly, as illustrated in FIG. 1, a reference station 6 that enables positioning by the RTK-GNSS is installed at a known location in the periphery of the field.

As illustrated in FIGS. 1 and 6, the tractor 1 and the reference station 6 each include the following: GNSS antennas 33 and 60 that receive a radio wave transmitted from a positioning satellite 7 (see FIG. 1); and communication modules 34 and 61 that enable wireless communication of information including positioning information between the tractor 1 and the reference station 6. As a result, the satellite navigation device 31 in the positioning unit 30 can measure the current position and the current orientation of the tractor 1 with a high degree of accuracy on the basis of: the positioning information that is acquired when the GNSS antenna 33 on the tractor side receives the radio wave from the positioning satellite 7; and the positioning information that is acquired when the GNSS antenna 60 on the base station side receives the radio wave from the positioning satellite 7. The positioning unit 30 includes the satellite navigation device 31 and the inertial measurement device 32 so as to measure the current position, the current orientation, and the posture angle (yaw angle, roll angle, pitch angle) of the tractor 1 with high degree of accuracy.

In this tractor 1, the inertial measurement device 32 of the positioning unit 30, the GNSS antenna 33, and the communication module 34 are included in an antenna unit 35 illustrated in FIG. 1. The antenna unit 35 is disposed at central area in a left-right direction of an upper portion on a front surface side of the cabin 13. A mounted position of the GNSS antenna 33 on the tractor 1 corresponds to a positioning target position at the time of measurement of the current position and the like of the tractor 1 by using the GNSS.

As illustrated in FIG. 6, the mobile communication terminal 5 includes an electronic control unit in which a microcontroller or the like is integrated, a terminal control unit 51 having various control programs, and the like. The terminal control unit 51 includes: a display control section 51A that executes control related to display and notification to the display device 50 and the like; a target route generation section 51B that generates a target route P for the automatic travel; a non-volatile terminal storage section 51C that stores the target route P generated by the target route generation section 51B and the like. The terminal storage section 51C stores, as various types of information used to generate the target route P, vehicle body information on a turning radius, a work width, and the like of the tractor 1, field information that is acquired from the above-described positioning information, and the like. The field information includes: four corner points Ap1 to Ap4 (see FIG. 5) that serve as a plurality of shape specifying points (shape specifying coordinates) in the field A when a shape, size, and the like of the field A are specified, the corner points Ap1 to Ap4 being acquired by using the GNSS when the tractor 1 travels along an outer peripheral edge of the field A; and a rectangular shape specifying line AL (see FIG. 5) that is acquired by connecting the corner points Ap1 to Ap4 to specify the shape, the size, and the like of the field A.

As illustrated in FIG. 6, the tractor 1 and the mobile communication terminal 5 are provided with communication modules 28 and 52, respectively, that enable wireless communication of information including positioning information between the in-vehicle control unit 23 and the terminal control unit 3B. The communication module 28 of the tractor 1 functions as a converter that converts the communication information bidirectionally into CAN and Wi-Fi when Wi-Fi is employed for wireless communication with the mobile communication terminal 5. The terminal control unit 3B can obtain various types of information about the tractor 1 including the current position and current orientation of the tractor 1 through wireless communication with the in-vehicle control unit 23. In this way, various types of information including the current position and current orientation of the tractor 1 relative to the target route P can be displayed on the display device 3A of the mobile communication terminal 5.

The target route generation section 51B generates the target route P on the basis of the turning radius and the work width of the tractor 1 included in the vehicle body information, the shape and the size of the field A included in the field information, and the like. For example, as illustrated in FIG. 5, in the rectangular field A, in the case where a start point p1 and an end point p2 of the automatic travel are set, and a work travel direction of the tractor 1 is set to a direction along a short side of the field A, the target route generation section 51B first divides the field A into a margin area A1 that is adjacent to the outer peripheral edge of the field A and a travel area A2 that is located on the inside of the margin area A1 on the basis of the above-described four corner points Ap1 to Ap4 and the rectangular shape specifying line AL. Next, on the basis of the turning radius, the work width, and the like of the tractor 1, the target route generation section 51B generates a plurality of parallel routes P1 and a plurality of turning routes P2 in the travel area A2. The parallel routes P1 are arranged in a direction along a long side of the field A and are arranged in parallel at regular intervals corresponding to the work width. The turning routes P2 are arranged in outer edge portions on long sides of the travel area A2 and connect the parallel routes P1 in a travel order of the tractor 1. Then, the target route generation section 51B divides the travel area A2 into paired non-work areas A2a, each of which is set in the outer edge portion on each of the long sides of the travel area A2, and a work area A2b set between the paired non-work areas A2a, and divides each of the parallel routes P1 into non-work routes P1a included in the paired non-work areas A2a and work routes P1b included in the work area A2b. In this way, the target route generation section 51B can generate the target route P that is suited for the automatic travel of the tractor 1 in the field A illustrated in FIG. 5.

In the field A illustrated in FIG. 5, the margin area A1 is an area that is secured between the outer peripheral edge of the field A and the travel area A2 in order to prevent the rotary tiller 3 or the like from coming into contact with another object, such as a ridge adjacent to the field A, while the tractor 1 automatically travels in an outer peripheral portion of the travel area A2. Each of the non-work areas A2a is a ridge turning area for the tractor 1 to turn from the current work route P1b to the next work route P1b at the ridge of the field A.

In the target route P illustrated in FIG. 5, each of the non-work routes P1a and each of the turning routes P2 are routes in each of which the tractor 1 travels automatically without performing tilling work, and each of the above-described work routes P1b is a route in which the tractor 1 travels automatically while performing the tilling work. A start point p3 of each of the work routes P1b is a work start point where the tractor 1 starts the tilling work, and an end point p4 of each of the work routes P1b is a work stop point where the tractor 1 stops the tilling work. Each of the non-work routes P1a is an alignment route for aligning the work stop point p4 before turning of the tractor 1 on the turning route P2 and the work start point p3 after turning of the tractor 1 on the turning route P2 in the work travel direction of the tractor 1. Of the connection points p5 and p6 between the each of the parallel routes P1 and each of the turning routes P2, the connection point p5 on an end side of each of the parallel routes P1 is a turning start point of the tractor 1, and the connection point p6 on a start side of each of the parallel routes P1 is a turning end point of the tractor 1.

The target route P illustrated in FIG. 5 is merely an example. Based on the vehicle body information that differs by a model, a work type, and the like of the tractor 1 and the field information on the shape, the size, and the like of the field A that differs by the field A, and the like, the target route generation section 51B can generate any of various target routes P suited for those.

In a state associated with vehicle body information, the field information, and the like, the target route P is stored in the terminal storage section 51C, and can be displayed on the display device 50 of the mobile communication terminal 5. The target route P includes: a target vehicle speed of the tractor 1 on each of the parallel routes P1; the target vehicle speed of the tractor 1 on each of the turning routes P2b; a front wheel steering angle on each of the parallel routes P1; and the front wheel steering angle on each of the turning routes P2b.

The terminal control unit 51 transmits the field information, the target route P, and the like that are stored in the terminal storage section 51C to the in-vehicle control unit 23 in response to a transmission request command from the in-vehicle control unit 23. The in-vehicle control unit 23 stores the received field information, the received target route P, and the like in the in-vehicle storage section 23G. In regard to the transmission of the target route P, for example, the terminal control unit 51 may transmit all of the target routes P from the terminal storage section 51C to the in-vehicle control unit 23 at once at a stage before the tractor 1 starts the automatic travel. Alternatively, the terminal control unit 51 may divide the target route P into multiple pieces of divided route information per predetermined distance. Then, at the stage before the tractor 1 starts the automatic travel, every time a travel distance of the tractor 1 reaches the predetermined distance, the terminal control unit 51 may sequentially transmit the predetermined number of pieces of the divided route information corresponding to a travel order of the tractor 1 from the terminal storage section 51C to the in-vehicle control unit 23.

In the in-vehicle control unit 23, the automatic travel control section 23F receives the detection information from the various sensors, the various switches, and the like included in the vehicle state detection device 22 via the vehicle speed control section 23B, the steering control section 23C, and the like. In this way, the automatic travel control section 23F can monitor the various setting states and the operation states of the sections in the tractor 1.

In a state where a user such as the occupant or an administrator performs a manual operation to satisfy various automatic travel start conditions and a travel mode of the tractor 1 is switched to an automatic travel mode, when the display device 50 of the mobile communication terminal 5 is operated to command the start of the automatic travel, the automatic travel control section 23F starts automatic travel control in which the tractor 1 travels automatically along the target route P while the positioning unit 30 acquires the current position, the current orientation, and the like of the tractor 1.

During the automatic travel control, for example, in the case where the user operates the display device 50 of the mobile communication terminal 5 to command termination of the automatic travel, or in the case where the user in the driving unit 12 operates a manual operation tool such as the steering wheel 25 or the accelerator pedal, the automatic travel control section 23F terminates the automatic travel control and switches the travel mode from the automatic travel mode to a manual travel mode. In the case where the automatic travel control is restarted after the termination of the automatic travel control, just as described, first, the user gets into the driving unit 12 and switches the travel mode of the tractor 1 from the automatic travel mode to the manual travel mode. Next, after performing the manual operation to satisfy the various automatic travel start conditions, the user switches the travel mode of the tractor 1 from the manual travel mode to the automatic travel mode. Then, the automatic travel control can be restarted by operating the display device 50 of the mobile communication terminal 5 to command the start of the automatic travel.

The automatic travel control by the automatic travel control section 23F includes: engine automatic control processing for transmitting a control command for the automatic travel related to the engine 14 to the engine control section 23A; vehicle speed automatic control processing for transmitting a control command for the automatic travel related to the vehicle speed of the tractor 1 and the forward-reverse switching to the vehicle speed control section 23B; steering automatic control processing for transmitting a control command for the automatic travel related to steering to the steering control section 23C; and work automatic control processing for transmitting a control command for the automatic travel related to the work device such as the rotary tiller 3 to the work device control section 23D.

In the engine automatic control processing, the automatic travel control section 23F transmits an engine speed change command and the like to the engine control section 23A. The engine speed change command commands to change the engine speed on the basis of a set speed and the like that are included in the target route P. The engine control section 23A executes engine speed change control for automatically changing the engine speed in response to any of the various control commands that are related to the engine 14 and transmitted from the automatic travel control section 23F.

In the vehicle speed automatic control processing, the automatic travel control section 23F transmits, to the vehicle speed control section 23B, a gear shift operation command to command a gear shift operation of the continuously variable transmission on the basis of the target vehicle speed included in the target route P, a forward-reverse switching command to command a forward-reverse switching operation of the forward-reverse switching device on the basis of an advancing direction and the like of the tractor 1 included in the target route P, and the like. In response to the various control commands that are related to the continuously variable transmission, the forward-reverse switching device, and the like and are transmitted from the automatic travel control section 23F, the vehicle speed control section 23B executes automatic vehicle speed control for automatically controlling the actuation of the continuously variable transmission, automatic forward-reverse switching control for automatically controlling actuation of the forward-reverse switching device, and the like. The automatic vehicle speed control includes automatic deceleration stop processing and the like. In the automatic deceleration stop processing, in the case where the target vehicle speed included in the target route P is zero, for example, deceleration control is executed to bring the continuously variable transmission into the zero-speed state, so as to stop the travel of the tractor 1.

In the steering automatic control processing, the automatic travel control section 23F transmits, to the steering control section 23C, a steering command to command steering of the left and right front wheels 10 on the basis of the front wheel steering angle and the like included in the target route P, and the like. In response to the steering command that is transmitted from the automatic travel control section 23F, the steering control section 23C executes: automatic steering control for controlling the actuation of the power steering unit 17 to steer the left and right front wheels 10; automatic brake turning control for actuating the brake unit 18 so as to actuate the brake on the inner side of the turn in the case where the left and right front wheels 10 are steered at the set angle or larger; and the like.

In the work automatic control processing, the automatic travel control section 23F transmits, to the work device control section 23D: a work start command to command switching of the rotary tiller 3 to a work state on the basis of the work start point p3 included in the target route P; a work stop command to command switching of the rotary tiller 3 to a non-work state on the basis of the work stop point p4 included in the target route P; and the like. In response to the various control commands that are related to the rotary tiller 3 and transmitted from the automatic travel control section 23F, the work device control section 23D executes: automatic work start control for controlling the actuation of the work clutch unit 19 and the lift drive unit 20 so as to lower and actuate the rotary tiller 3 to a work height and actuate the rotary tiller 3; automatic work stop control for stopping the rotary tiller 3 and lifting the rotary tiller 3 to a non-work height; and the like.

That is, the above-described automatic travel unit 4 includes the power steering unit 17, the brake unit 18, the work clutch unit 19, the lift drive unit 20, the rolling unit 21, the vehicle state detection device 22, the in-vehicle control unit 23, the positioning unit 30, and the communication modules 28 and 34. When these units are actuated properly, the tractor 1 can travel automatically along the target route P with the high degree of accuracy and can properly perform the tillage by using the rotary tiller 3.

As illustrated in FIGS. 6 to 7, the tractor 1 includes an obstacle detection unit 80 that monitors the surroundings of the tractor 1 and detects an obstacle present in the surroundings. The obstacles detected by the obstacle detection unit 80 are a person such as a worker working in the field A, another work vehicle, and an existing utility pole, tree, and the like in the field A.

As illustrated in FIGS. 1 to 4 and FIG. 7, the obstacle detection unit 80 includes: an imaging unit 80A that captures images of the surroundings of the tractor 1; an active sensor unit 80B that measures the distance to a measurement target object present in the surroundings of the tractor 1, and an information integration processing unit 80C that integrates and processes information from the imaging unit 80A; and an information integration processing unit 80C that integrates and processes the information from the imaging unit 80A and the measurement information from the active sensor unit 80B.

The imaging unit 80A includes: a front camera (an example of an imaging unit) 81, for which a first imaging range Ri1 in front of the cabin 13 is set as an imaging range; a rear camera (an example of an imaging unit) 82, for which a second imaging range Ri2 behind the cabin 13 is set as the imaging range; a right camera (an example of the imaging unit) 83, for which a third imaging range Ri3 to the right of the cabin 13 is set as the imaging range; a left camera (an example of the imaging unit) 84, for which a fourth imaging range Ri4 to the left of the cabin 13 is set as the imaging range; and an image processing device 85 that processes the images from the respective cameras 81 to 84.

As illustrated in FIG. 1, FIGS. 3 and 4, and FIG. 7, the active sensor unit 80B has: a front LiDAR sensor (an example of an active sensor) 7, for which a first measurement range Rm1 in front of the cabin 13 is set as a measurement range; a rear LiDAR sensor (an example of the active sensor) 87, for which a second measurement range Rm2 behind the cabin 13 is set as the measurement range; and a sonar (an example of the active sensor) 88, for which a third measurement range Rm3 to the right of the cabin 13 and a fourth measurement range Rm4 to the left of the cabin 13 are set as the measurement ranges. The LiDAR sensors 86 and 87 respectively have: measuring sections 86A and 87A that use a laser beam (for example, a pulsed near-infrared laser beam) as an example of measurement light to perform measurement in the first measurement range Rm1 and the second measurement range Rm2, respectively; LiDAR control sections 86B and 87B that generate distance images and the like on the basis of the measurement information from the measuring sections 86A and 87A. The sonar 88 includes a right ultrasonic sensor 88A, a left ultrasonic sensor 88B, and a single sonar control section 88C.

The information integration processing unit 80C, the image processing device 85, the LiDAR control sections 86B and 87B, and the sonar control section 88C are each constructed by an electronic control unit in which a microcontroller or the like is integrated, various control programs, and the like. The information integration processing unit 80C, the image processing device 85, the LiDAR control sections 86B and 87B, and the sonar control section 88C are connected to the in-vehicle control unit 23 in a mutually communicable manner via the CAN.

The front camera 81 and the rear camera 82 are arranged on a left-right center line of the tractor 1. The front camera 81 is disposed in the central portion in the left-right direction of the upper portion on a front end side of the cabin 13 and has a front-down posture to look down the front of the tractor 1 from a diagonally upper side. In this way, a predetermined range on a front side of the vehicle body with the left-right center line of the tractor 1 being a symmetrical axis is set as the first imaging range Ri1 of the front camera 81. The rear camera 82 is disposed in the central portion in the left-right direction of the upper portion on a rear end side of the cabin 13 and has a rear-down posture to look down the rear of the tractor 1 from the diagonally upper side. In this way, a predetermined range on a rear side of the vehicle body with the left-right center line of the tractor 1 being the symmetrical axis is set as the second imaging range Ri2 of the rear camera 82. The right camera 83 is disposed at the central portion in a front-rear direction of the upper portion on a right end side of the cabin 13 and has a right-down posture to look down the right of the tractor 1 from the diagonally upper side. In this way, a predetermined range on a right side of the vehicle body is set as the third imaging range Ri3 of the right camera 83. The left camera 84 is disposed at the central portion in the front-rear direction of the upper portion on the left end side of the cabin 13 and has a left-down posture to look down the left of the tractor 1 from the diagonally upper side. In this way, a predetermined range on a left side of the vehicle body is set as the fourth imaging range Ri4 of the left camera 84.

In the LiDAR sensors 86 and 87, the measuring sections 86A and 87A each measure a distance from respective one of the measuring sections 86A and 87A to each ranging point (an example of the measurement target object) in the first measurement range Rm1 or the second measurement range Rm2 by a time of flight (TOF) method for measuring the distance to the ranging point on the basis of a round-trip time from arrival of the emitted laser beam at the ranging point to return thereof. Each of the measuring sections 86A and 87A scans the laser beam vertically and horizontally at a high speed over respective one of the entire first measurement range Rm1 and the entire second measurement range Rm2, sequentially measures the distance to the ranging point per scan angle (coordinate), and thereby performs three-dimensional measurement in respective one of the entire first measurement range Rm1 and the entire second measurement range Rm2. Each of the measuring sections 86A and 87A sequentially measures intensity of reflected light (hereinafter referred to as reflection intensity) from each of the ranging points that are acquired when the laser beam is scanned vertically and horizontally at the high speed over respective one of the first measurement range Rm1 and the second measurement range Rm2. Each of the measuring sections 86A and 87A repeatedly measures the distance to each of the ranging points, the reflection intensity, and the like in real time in respective one of the first measurement range Rm1 and the second measurement range Rm2. Each of the LiDAR control sections 86B and 87B generates the distance image and extracts a ranging point group estimated to be an obstacle from the measurement information, such as the distance to each of the ranging points and the scan angle (coordinate) for each of ranging points, measured by respective one of the measuring sections 86A and 87A. Then, each of the LiDAR control sections 86B and 87B transmits, as measurement information on an obstacle candidate, the measurement information on the extracted ranging point group to the information integration processing unit 80C.

Each of the LiDAR control sections 86B and 87B determines whether a distance value of each of the ranging points measured by respective one of the measuring sections 86A and 87A satisfies the invalid condition, and transmits the distance value that satisfies the invalid condition as an invalid value to the information integration processing unit 80C. More specifically, each of the LiDAR control sections 86B and 87B uses a characteristic of dirt that is located on a sensor surface of respective one of the LiDAR sensors 86 and 87 that exists at a close distance from respective one of the LiDAR sensors 86 and 87, and sets the distance value of the ranging point having such a characteristic as the invalid value. This prevents the distance value of the ranging point related to the dirt on the sensor surface from being used as the information on the obstacle in the information integration processing unit 80C. Each of the LiDAR control sections 86B and 87B uses a characteristic of a floating matter such as dirt or fog that exists at the close distance from respective one of the LiDAR sensors 86 and 87 but has the extremely low reflection intensity, and sets the distance value of the ranging point having such a characteristic as the invalid value. This prevents the distance value of the ranging point related to the floating matter from being used as the information on the obstacle in the information integration processing unit 80C.

Figure 4:
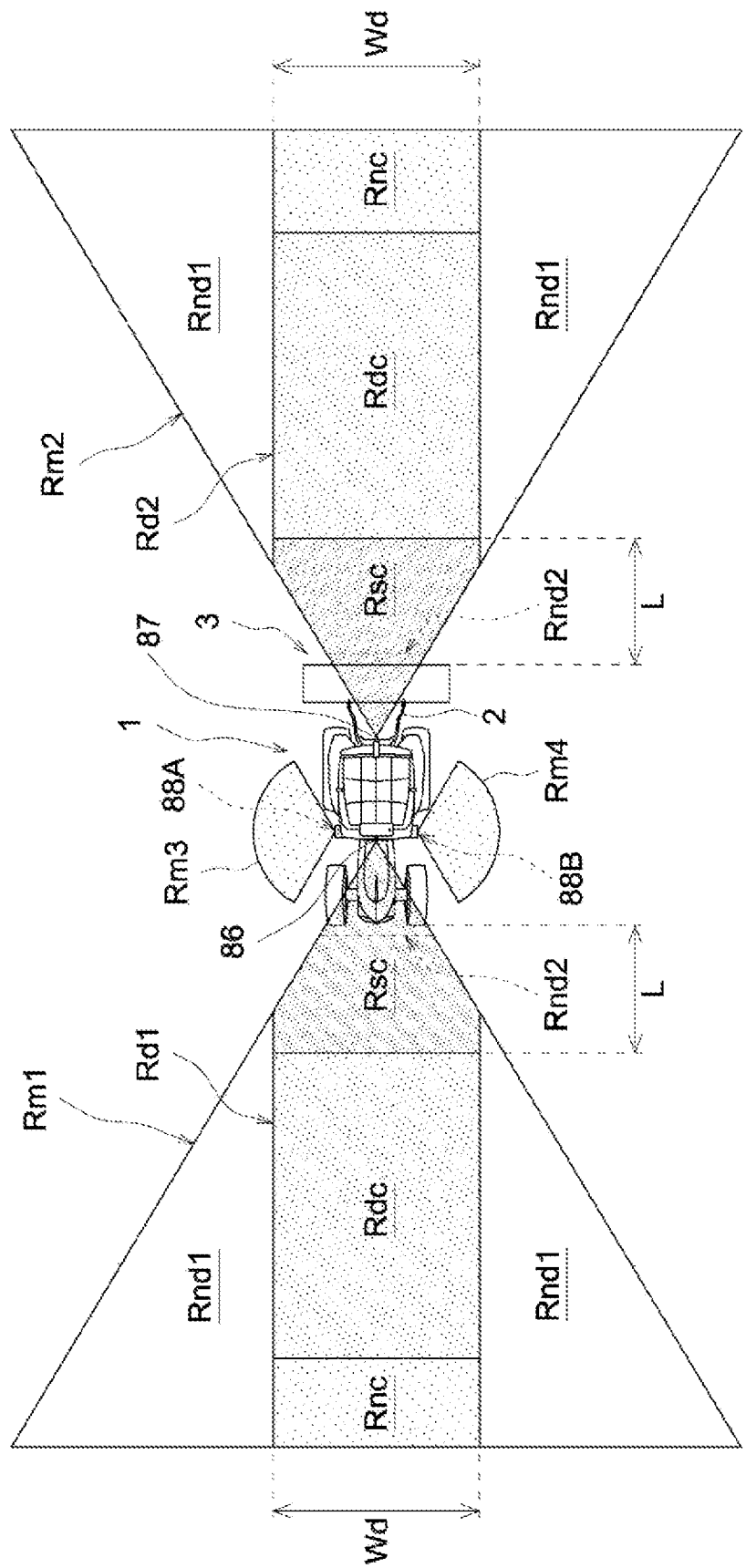
FIG. 4 is a plan view of a tractor showing the measurement ranges of each LiDAR sensor and a sonar.
Figure 5:
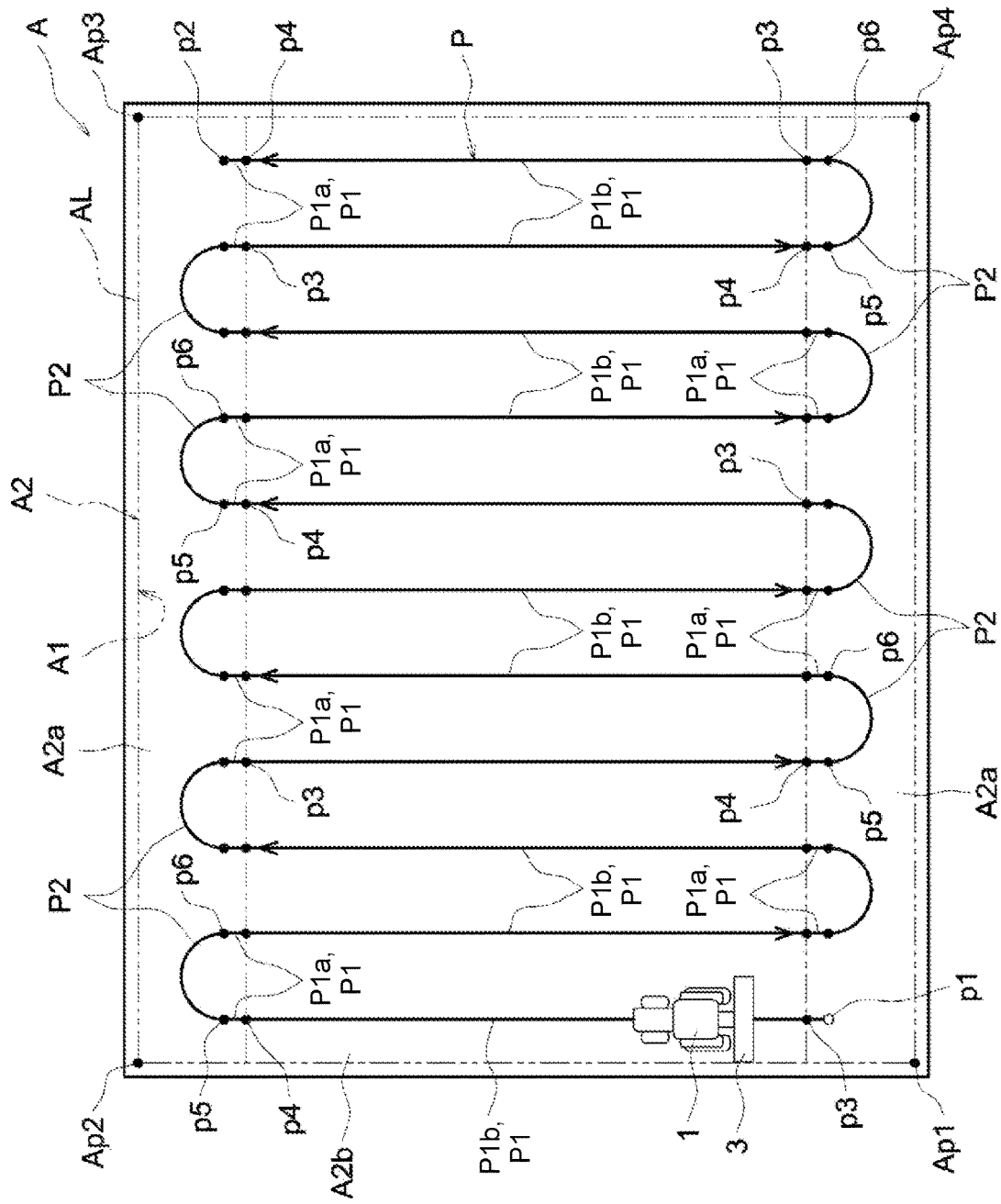
FIG. 5 is a plan view showing an example of a target route for automatic travel.

As illustrated in FIG. 1 and FIGS. 3 to 4, similar to the front camera 81 and the rear camera 82, the front LiDAR sensor 86 and the rear LiDAR sensor 87 are arranged on the left-right center line of the tractor 1. The front LiDAR sensor 86 is disposed at the center in the left-right direction of the upper portion on the front end side of the cabin 13 and has the front-down posture to look down the front of the tractor 1 from the diagonally upper side. In this way, the front LiDAR sensor 86 sets a predetermined range on the front side of the vehicle body with the left-right center line of the tractor 1 being the symmetrical axis as the first measurement range Rm1 by the measuring section 86A. The rear LiDAR sensor 87 is disposed at the center in the left-right direction of the upper portion on the rear end side of the cabin 13 and has the rear-down posture to look down the rear of the tractor 1 from the diagonally upper side. In this way, the rear LiDAR sensor 87 sets a predetermined range on the rear side of the vehicle body with the left-right center line of the tractor 1 being the symmetrical axis as the second measurement range Rm2 by the measuring section 87A.

In regard to the front LiDAR sensor 86 and the rear LiDAR sensor 87, during forward travel of the tractor 1 in which the forward-reverse switching device of the gear shift unit 16 is switched to a forward transmission state, in conjunction therewith, the front LiDAR sensor 86 is brought into an actuated state, and the rear LiDAR sensor 87 is brought into an actuation stop state. Meanwhile, during reverse travel of the tractor 1 in which the forward-reverse switching device of the gear shift unit 16 is switched to a reverse transmission state, in conjunction therewith, the front LiDAR sensor 86 is brought into the actuation stop state, and the rear LiDAR sensor 87 is brought into the actuated state.

As illustrated in FIG. 1, FIGS. 3 to 4, and FIG. 7, in the sonar 88, the sonar control section 88C determines presence or absence of the measurement target object in the third measurement range Rm3 or the fourth measurement range Rm4 on the basis of transmission and reception of the ultrasonic waves by the left and right ultrasonic sensors 88A and 88B. The sonar control section 88C measures a distance from each of the ultrasonic sensors 88A and 88B to the measurement target object by the time of flight (TOF) method for measuring the distance to the ranging point on the basis of the round-trip time from arrival of the transmitted ultrasonic wave at the ranging point to return thereof, and transmits, to the information integration processing unit 80C, the distance to the measurement target object that has been measured and the direction of the measurement target object as the measurement information on the obstacle candidate.

Figure 2:
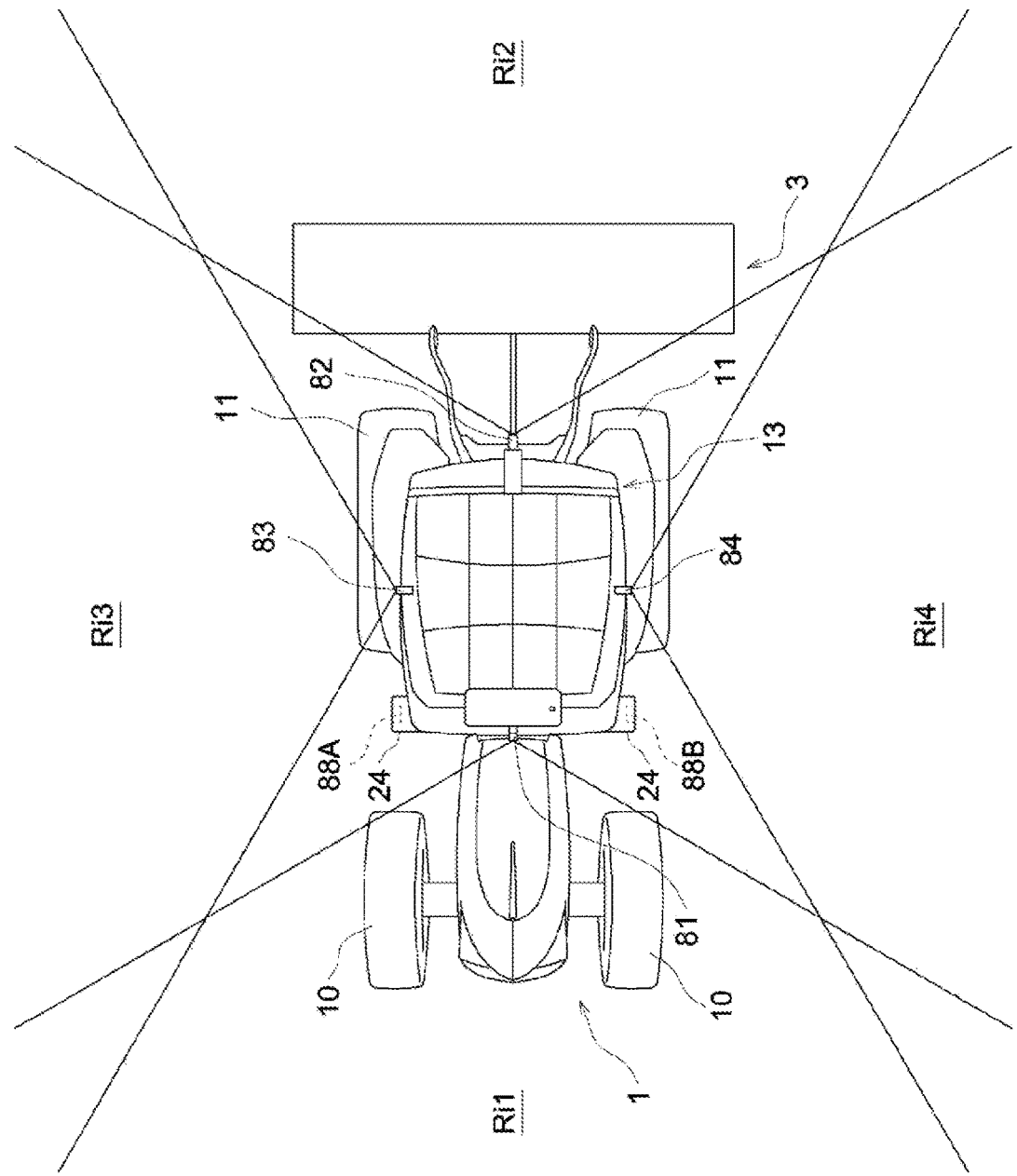
FIG. 2 is a plan view of a tractor showing imaging ranges of cameras.

Although not illustrated, the right ultrasonic sensor 88A is attached to a getting-on/off step on a right side that is disposed between the right front wheel 10 and the right rear wheel 11 and has a posture facing a right outer side of the vehicle body. Accordingly, a predetermined range on the right outer side of the vehicle body is set as the third measurement range Rm3 of the right ultrasonic sensor 88A. As illustrated in FIGS. 1 to 3, the left ultrasonic sensor 88B is attached to the getting-on/off step 24 on a left side that is disposed between the front wheel 10 and the rear wheel 11 on the left side and has a posture facing a left outer side of the vehicle body. Accordingly, a predetermined range on the left outer side of the vehicle body is set as the fourth measurement range Rm4 of the left ultrasonic sensor 88B.

As illustrated in FIG. 4 and FIGS. 8 to 10, the LiDAR control sections 86B and 87B perform cut processing and masking processing, which are based on the vehicle body information and the like, for the measurement ranges Rm1 and Rm2 of the measuring sections 86A and 87A, and thereby set a first detection range Rd1 and a second detection range Rd2 for the above-described obstacle candidate as a detection target, respectively. In the cut processing, the LiDAR control sections 86B and 87B acquire a maximum left-right width of the vehicle body including the rotary tiller 3 (a left-right width of the rotary tiller 3 in the present embodiment) by the communication with the in-vehicle control unit 23, add a predetermined safety range to this maximum left-right width of the vehicle body, and thereby set a detection target width Wd of the obstacle candidate. Then, in the first measurement range Rm1 and the second measurement range Rm2, the LiDAR control sections 86B and 87B set each of left and right ranges on the outside of the detection target width Wd as a first non-detection range Rnd1 by the cut processing, and eliminate the first non-detection range Rnd1 from each of the detection ranges Rd1 and Rd2. In the masking processing, the LiDAR control sections 86B and 87B set, as a second non-detection range Rnd2 by the masking processing, a range acquired by adding a predetermined safety range to each of a range in which the front end side of the tractor 1 is located in the first measurement range Rm1 and a range in which the rear end side of the rotary tiller 3 is located in the second measurement range Rm2, and eliminates the second non-detection range Rnd2 from each of the detection ranges Rd1 and Rd2. In this way, the detection target ranges of the obstacle candidate by the LiDAR sensors 86 and 87 are limited to the first detection range Rd1 and the second detection range Rd2. Due to such limitation, each of the LiDAR sensors 86 and 87 avoids an increase in a detection load caused by detection of the obstacle candidate that is out of the detection target width Wd and has no risk of colliding with the tractor 1, and avoids the risk of erroneous detection of the front end side of the tractor 1 and the rear end side of the tractor 1 including the rotary tiller 3, which are located in the first measurement range Rm1 and the second measurement range Rm2, as the obstacle candidate.

Figure 8:
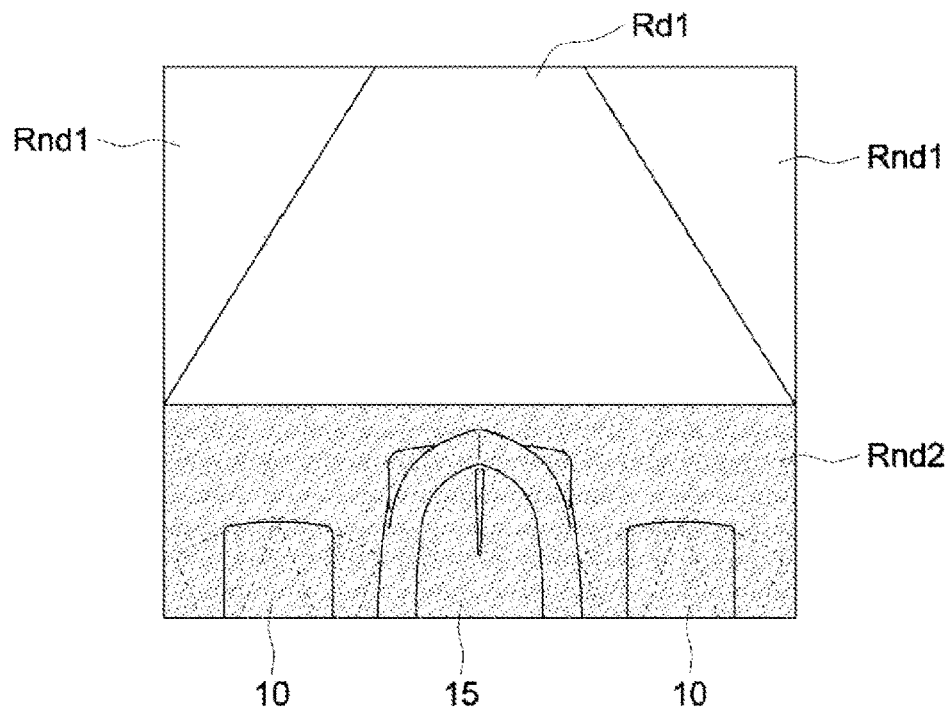
FIG. 8 is a diagram illustrating a detection range and a non-detection range of an obstacle in a distance image by a front LiDAR sensor.
Figure 9:
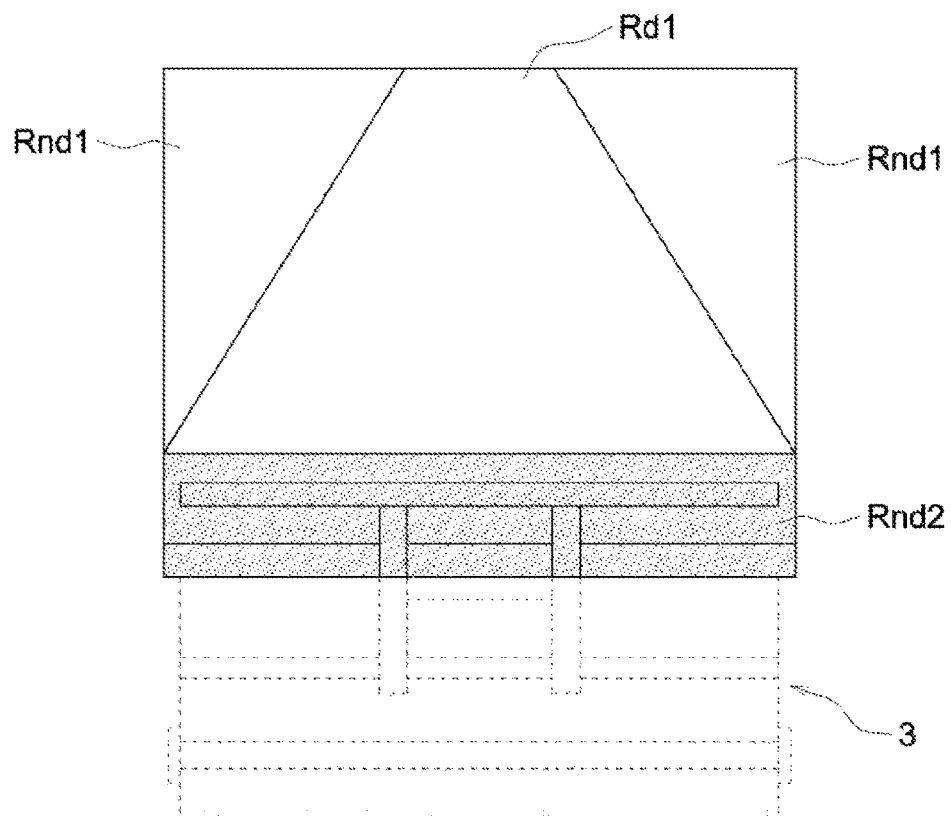
FIG. 9 is a diagram illustrating a detection range and a non-detection range of an obstacle in a distance image by a rear LiDAR sensor in a lowered state of a work device.
Figure 10:
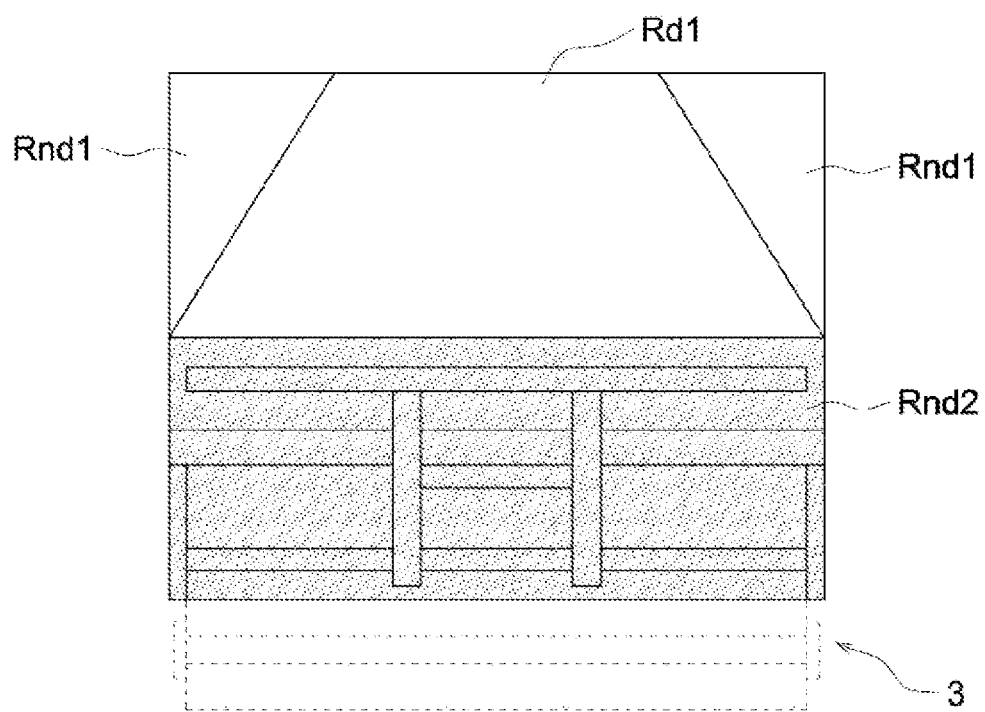
FIG. 10 is a view illustrating a detection range and a non-detection range of the obstacle in a distance image by a rear LiDAR sensor in a raised state of a work device.

The second non-detection range Rnd2 illustrated in FIG. 8 is an example of the non-detection range suited for the front side of the vehicle body where the left and right front wheels 10 and the hood 15 are present. The second non-detection range Rnd2 illustrated in FIG. 9 is an example of the non-detection range suited for the work state in which the rotary tiller 3 on the rear side of the vehicle body is lowered to the work height. The second non-detection range Rnd2 illustrated in FIG. 10 is an example of the non-detection range suited for the non-work state in which the rotary tiller 3 on the rear side of the vehicle body is lifted to a retreat height. The second non-detection range Rnd2 on the rear side of the vehicle body is appropriately switched in an interlocking manner with lifting or lowering of the rotary tiller 3.

Information on the first detection range Rd1, the second detection range Rd2, the first non-detection range Rnd1, and the second non-detection range Rnd2 is included in the above-described distance image and, with the above-described distance image, transmitted to the information integration processing unit 80C.

As illustrated in FIG. 4, the detection ranges Rd1 and Rd2 of the LiDAR sensors 86 and 87 are divided into a stop control range Rsc, a deceleration control range Rdc, and a notification control range Rnc on the basis of collision determination processing in which the collision prediction time is a set time (e.g., three seconds). The stop control range Rsc is set in the range from each of the LiDAR sensors 86 and 87 to a determination reference position of the collision determination processing. The deceleration control range Rdc is set in the range from the determination reference position to a deceleration start position. The notification control range Rnc is set in the range from the deceleration start position to a measurement limit position of each of the LiDAR sensors 86 and 87. Each of the determination reference position is set at a position that is away from the front end or the rear end of the vehicle body including the rotary tiller 3 in the front-rear direction of the vehicle body by a certain separation distance L (for example, 2000 mm).

The image processing device 85 performs image processing on the images that are sequentially transmitted from the cameras 81 to 84. The image processing device 85 is subjected to learning processing for recognizing, as obstacles, the person such as the worker working in the field A, the other work vehicle, and the existing utility pole, tree, and the like in the field A.

Figure 11:
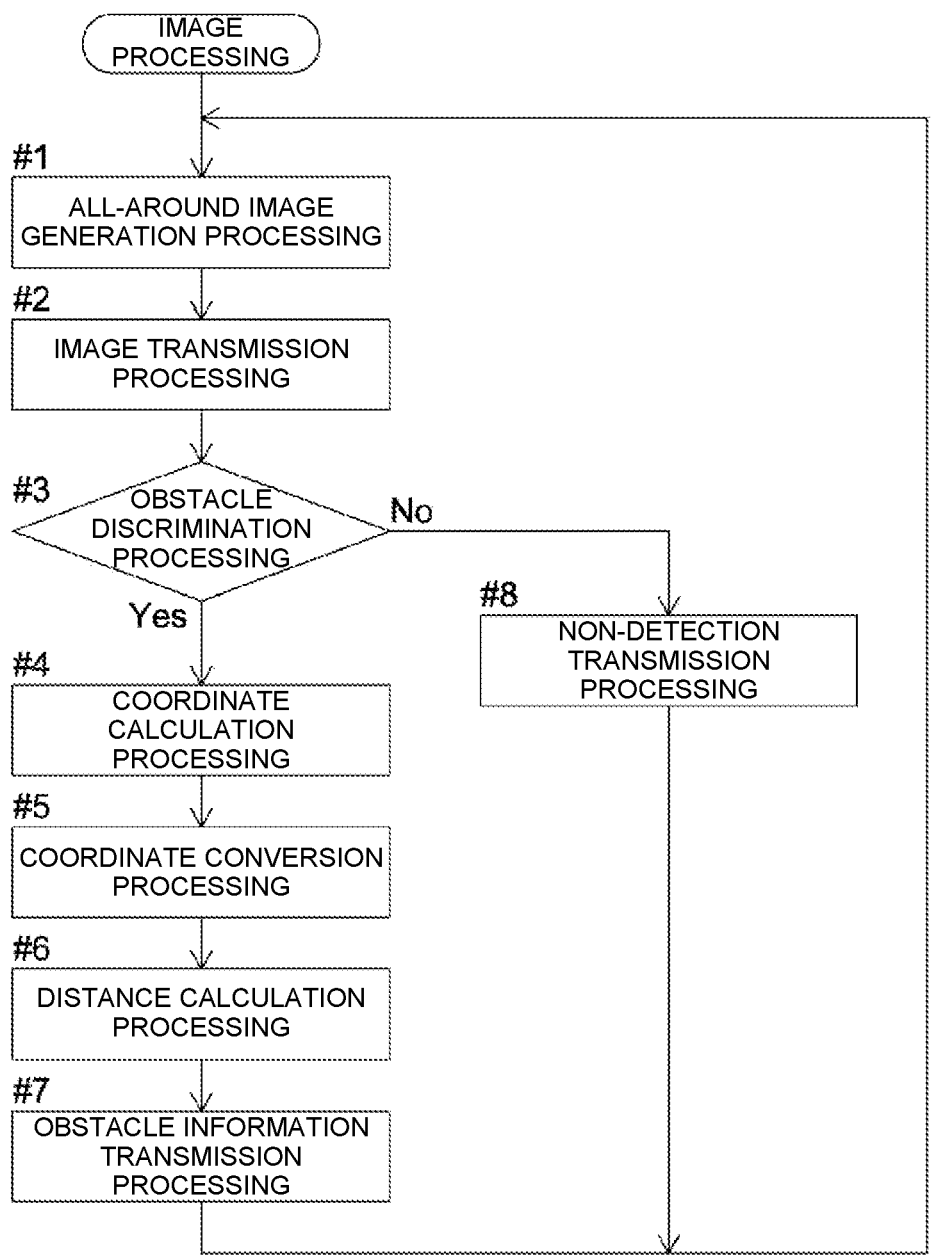
FIG. 11 is a flowchart illustrating a processing procedure by an image processing device in image processing.

A description will hereinafter be made on a processing procedure the image processing by the image processing device 85 with reference to a flowchart illustrated in FIG. 11.

For the images that are sequentially transmitted from the cameras 81 to 84, the image processing device 85 first performs all-around image generation processing to synthesize the images from all the cameras 81 to 84, and generate an all-around image (for example, a surround view) of the tractor 1 (step #1). Then, the image processing device 85 performs image transmission processing to transmit the generated all-around image and the images from the cameras 81 to 84 to the display control section 23E on the tractor side and the display control section 51A on a mobile communication terminal side (step #2). In this way, the all-around image generated by the all-around image generation section 86A, the image in the travel direction of the tractor 1, and the like can be displayed on the liquid crystal monitor 27 of the tractor 1, the display device 50 of the mobile communication terminal 5, and the like. Then, by such display, the user can visually recognize a situation in the surroundings of the tractor 1 and a situation in the travel direction.

Next, the image processing device 85 performs obstacle discrimination processing to discriminate whether or not an obstacle O that affects the travel of the tractor 1 exists in any of the imaging ranges Ri1 to Ri4 of the cameras 81 to 84 on the basis of the images (see FIGS. 14 to 16) that are sequentially transmitted from the cameras 81 to 84 (step #3). If the obstacle O exists, the image processing device 85 performs coordinate calculation processing to calculate the coordinates (coordinates x,y illustrated in FIG. 15) of the obstacle O on the image where the obstacle O exists (step #4), and performs coordinate conversion processing to convert the calculated coordinates of the obstacle into coordinates with a vehicle body coordinate origin being a reference on the basis of mounted positions, mounted angles, and the like of the cameras 81 to 84 (step #5). Then, the image processing device 85 performs distance calculation processing to calculate a linear distance between the converted coordinates and a preset distance calculation reference point as a distance from the distance calculation reference point to the obstacle O (step #6). Thereafter, the image processing device 85 performs obstacle information transmission processing to transmit, as information on the obstacle O, the calculated distance from the converted coordinates to the obstacle O to the information integration processing unit 80C (step #7). Thereafter, processing returns to step #1. On the other hand, if the obstacle O does not exist, the image processing device 85 performs non-detection transmission processing to transmit a fact that the obstacle has been detected to the information integration processing unit 80C (step #8). Thereafter, processing returns to step #1.

Just as described, in the case where the obstacle exists in any of the imaging ranges Ri1 to Ri4 of the cameras 81 to 84, the image processing device 85 transmits the information of the obstacle to the information integration processing unit 80C. Accordingly, when receiving the information of the obstacle, the information integration processing unit 80C can notice that the obstacle exists in any of the imaging ranges Ri1 to Ri4 of the cameras 81 to 84, and can acquire a position of the obstacle and the distance to the obstacle. On the other hand, in the case where the obstacle does not exist in any of the imaging ranges Ri1 to Ri4 of the cameras 81 to 84, the image processing device 85 transmits the non-detection of the obstacle to the information integration processing unit 80C. Thus, the information integration processing unit 80C can notice that the obstacle does not exist in any of the imaging ranges Ri1 to Ri4 of the cameras 81 to 84.

Figure 12:
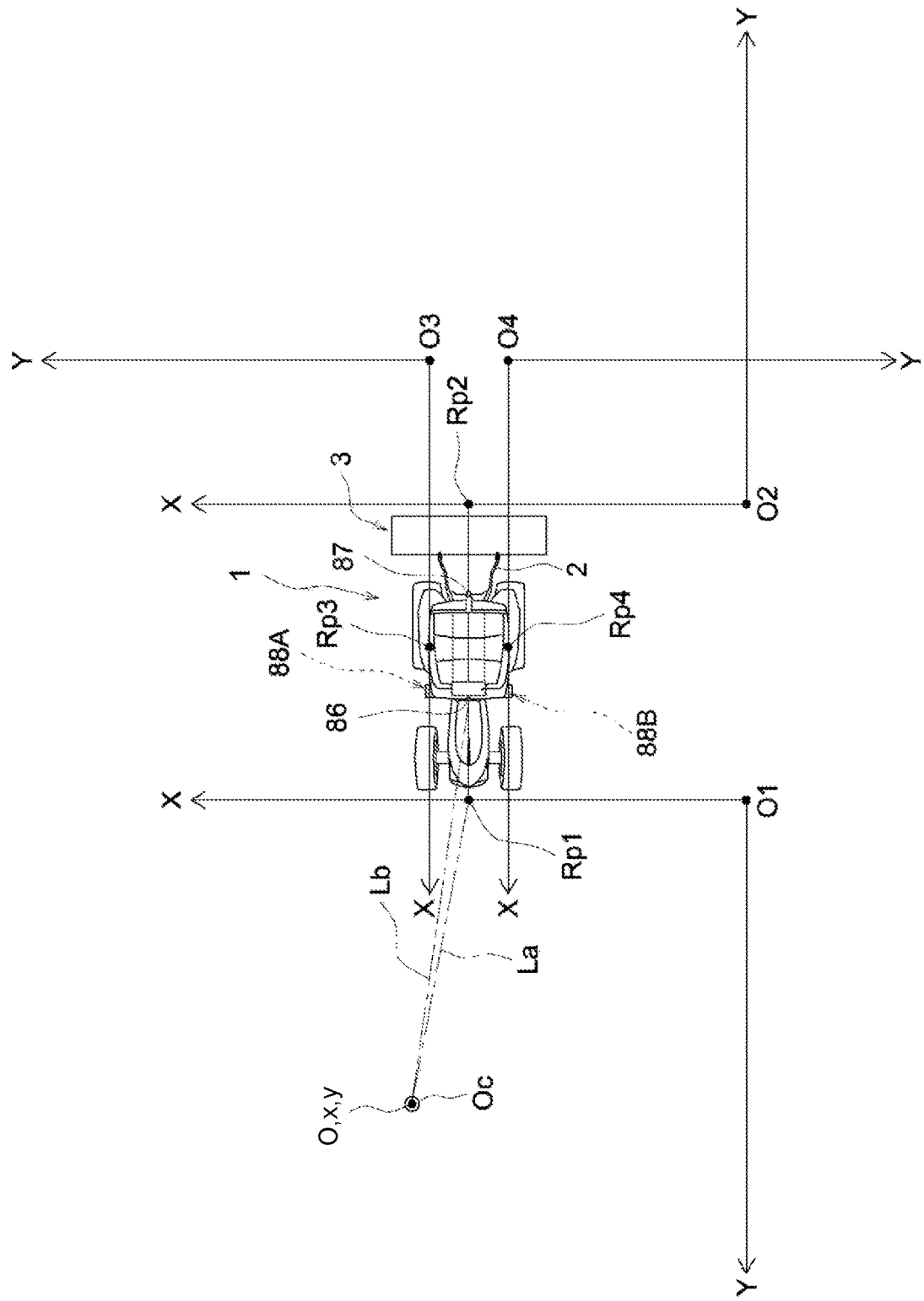
FIG. 12 is a plan view showing the positional relationship between mounted positions of the respective cameras, vehicle body coordinate origins, and distance calculation reference points.
Figure 13:
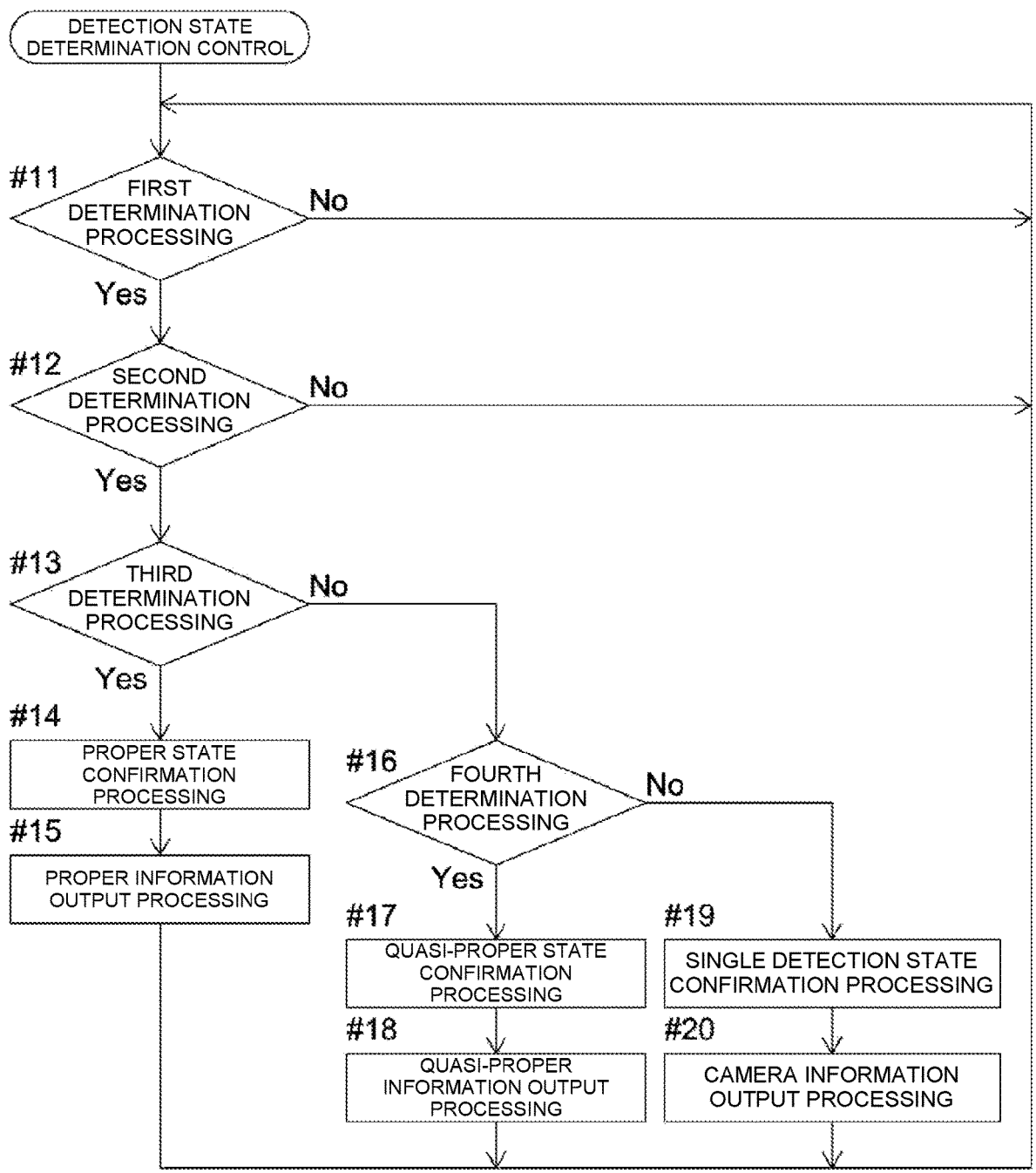
FIG. 13 is a flowchart illustrating a processing procedure of an information integration processing unit in detection state determination control.

The vehicle body coordinate origin in the above coordinate conversion processing and the distance calculation reference point in the distance calculation processing are set in accordance with the mounted positions of the cameras 81 to 84. More specifically, as illustrated in FIG. 12, a vehicle body coordinate origin O1 and a distance calculation reference point Rp1 are set for the front camera 81 in accordance with the mounted position thereof. A vehicle body coordinate origin O2 and a distance calculation reference point Rp2 are set for the rear camera 82 in accordance with the mounted position thereof. A vehicle body coordinate origin O3 and a distance calculation reference point Rp3 are set for the right camera 83 in accordance with the mounted position thereof. A vehicle body coordinate origin O4 and a distance calculation reference point Rp4 are set for the left camera 84 in accordance with the mounted position thereof.

Accordingly, for example, in the case where the obstacle exists in the first imaging range Ri1 of the front camera 81, the image processing device 85 calculates the coordinates of the obstacle on the image of the front camera 81 in which the obstacle exists (the coordinate calculation processing), converts the calculated coordinates of the obstacle into coordinates (x, y) with the vehicle body coordinate origin O1 illustrated in FIG. 12 being a reference on the basis of the mounted position, the mounted angle, and the like of the front camera 81 (the coordinate conversion processing), and calculates a linear distance from the converted coordinates (x, y) to the distance calculation reference point Rp1 as a distance La from the distance calculation reference point Rp1 to an obstacle O (the distance calculation processing).

Settings of relationships among the vehicle body coordinate origins O1 to O4, the distance calculation reference points Rp1 to Rp4, and the mounted positions of the cameras 81 to 84 described above can be changed in various ways.

In the above-described obstacle discrimination processing, the image processing device 85 discriminates the presence or the absence of the obstacle at an ultra-high speed of several tens of frames (for example, 30 frames) per second in each of the images that are sequentially transmitted from the cameras 81 to 84. The image processing device 85 performs the obstacle discrimination processing for each of the cameras 81 to 84 by a time division system. The image processing device 85 changes a processing target cycle per unit time for each of the cameras 81 to 84 by the time division system in accordance with the travel direction and the vehicle speed of the tractor 1.

In this way, the image processing device 85 can sequentially and promptly perform obstacle discrimination processing without delay on the images from each of the cameras 81 to 84, which have a large processing load. The image processing device 85 makes it possible to speed up the processing target cycle per unit time for each of the cameras 81 to 84 having imaging ranges in the travel direction of the tractor 1 in accordance with the travel direction of the tractor 1 increases, and to slow down the processing target cycle per unit time for each of the cameras 81 to 84 not having imaging ranges in the travel direction of the tractor 1. Therefore, the presence or absence of obstacles in the travel direction of the tractor 1 can be discriminated with emphasis and without increasing the processing load. Furthermore, the image processing device 85 makes it possible to speed up the processing target cycle per unit time for each of the cameras 81 to 84 having imaging ranges in the travel direction of the tractor 1 as the vehicle speed of the tractor 1 increases, and to slow down the processing target cycle per unit time for each of the cameras 81 to 84 not having imaging ranges in the travel direction of the tractor 1. Therefore, the presence or absence of obstacles in the travel direction of the tractor 1 can be discriminated with more emphasis as the vehicle speed of the tractor 1 increases and without increasing the processing load. As a result, it is easier to avoid collisions with obstacles.

In addition, as illustrated in FIG. 7, the image processing device 85 acquires the vehicle speed of the tractor 1, which is detected by the vehicle speed sensor 22A, via the vehicle speed control section 23B. The image processing device 85 discriminates the travel direction of the tractor 1 on the basis of the operation position of the reverser lever acquired via the vehicle speed control section 23B and the steering angles of the front wheels 10 acquired via the steering control section 23C.

The information integration processing unit 80C performs the detection state determination control to determine the detection state of an obstacle by the imaging unit 80A and the active sensor unit 80B on the basis of the information from the imaging unit 80A, which has low ranging accuracy but high object discrimination accuracy, and the measurement information from the active sensor unit 80B, which has low object discrimination accuracy but high ranging accuracy.

A description will hereinafter be made on control actuation of the information integration processing unit 80C in the detection state determination control with reference to the flowchart illustrated in FIG. 13 and FIGS. 14 to 21. Now will be described only the control actuation of the information integration processing unit 80C in the case where the detection state of an obstacle by the front camera 81 of the imaging unit 80A and the front LiDAR sensor 86 of the active sensor unit 80B is determined on the basis of the information from the imaging unit 80A and the measurement information from the active sensor unit 80B. In addition to the above, since the control actuation of the information integration processing unit 80C in the case of determination of the detection state of an obstacle by the rear camera 82 and the rear LiDAR sensor 87, the detection accuracy of the obstacle by the right camera 83 and the right ultrasonic sensor 88A, and the detection accuracy of the obstacle by the left camera 84 and the left ultrasonic sensor 88B is similar to that in the case of determination of the detection accuracy of the obstacle by the front camera 81 and the front LiDAR sensor 86, a description of the control actuation of the information integration processing unit 80C in such cases is omitted.

Figure 14:
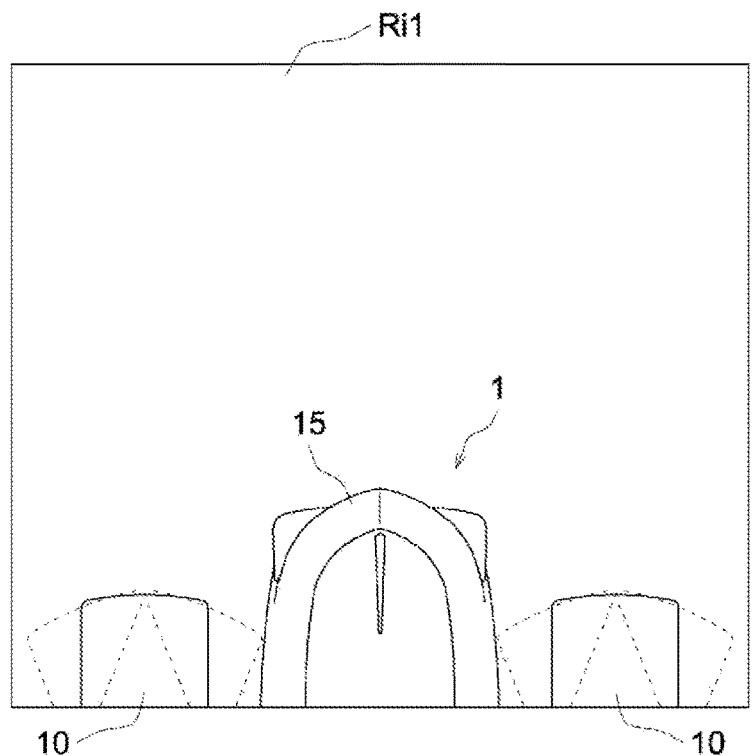
FIG. 14 is a diagram illustrating a front camera image in an obstacle undetected state.
Figure 15:
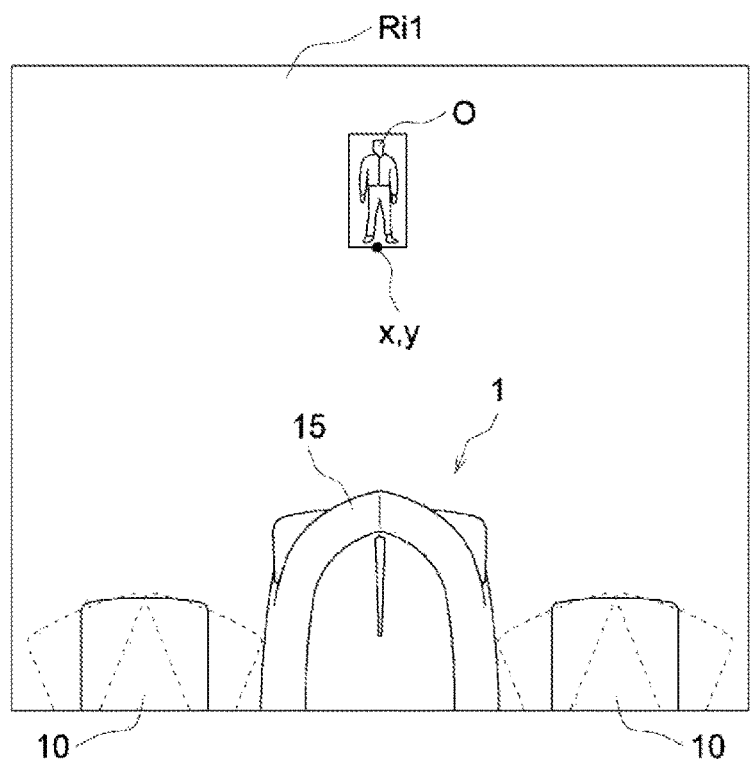
FIG. 15 is a diagram illustrating a front camera image in an obstacle detected state.
Figure 16:
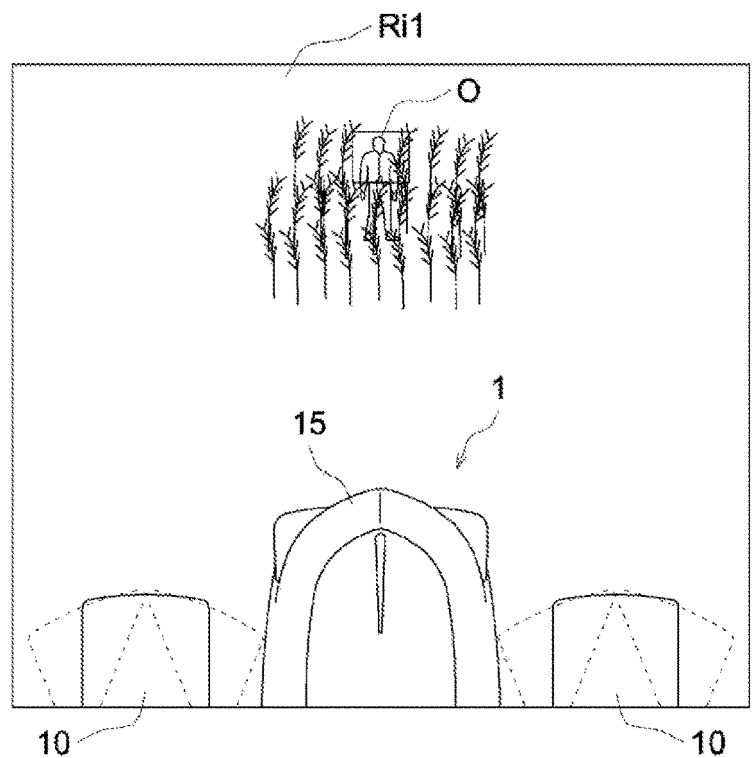
FIG. 16 is a diagram illustrating a front camera image in an obstacle detected state.
Figure 17:
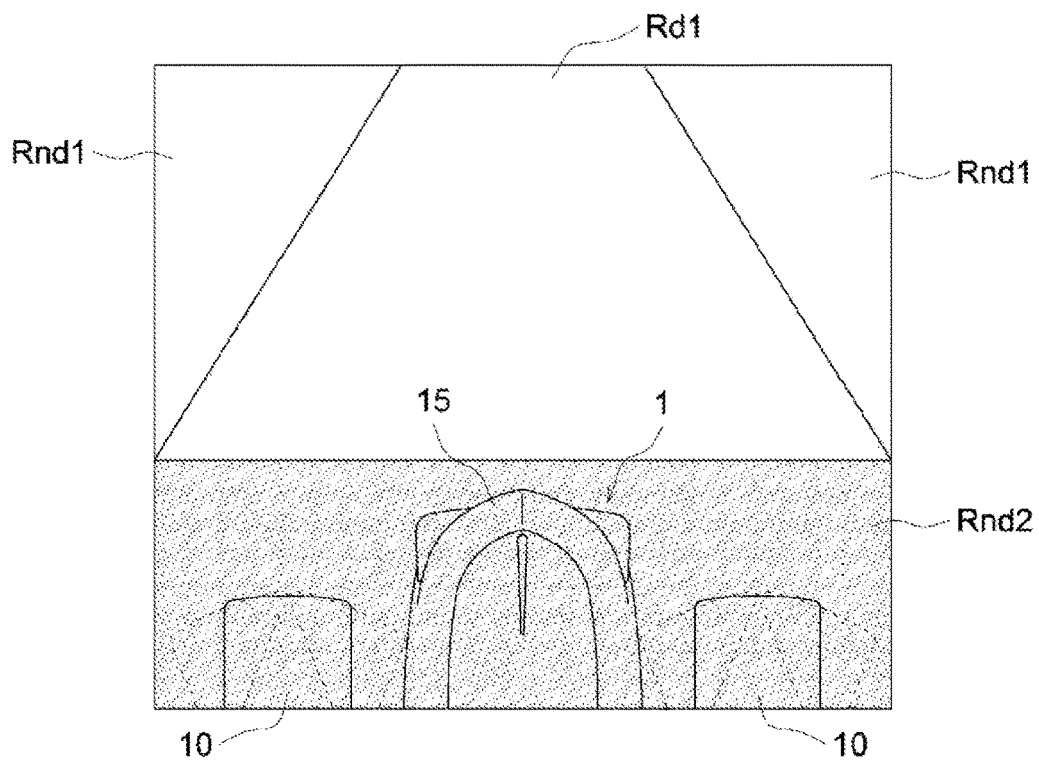
FIG. 17 is a diagram illustrating a distance image of a front LiDAR sensor in an obstacle undetected state.
Figure 18:
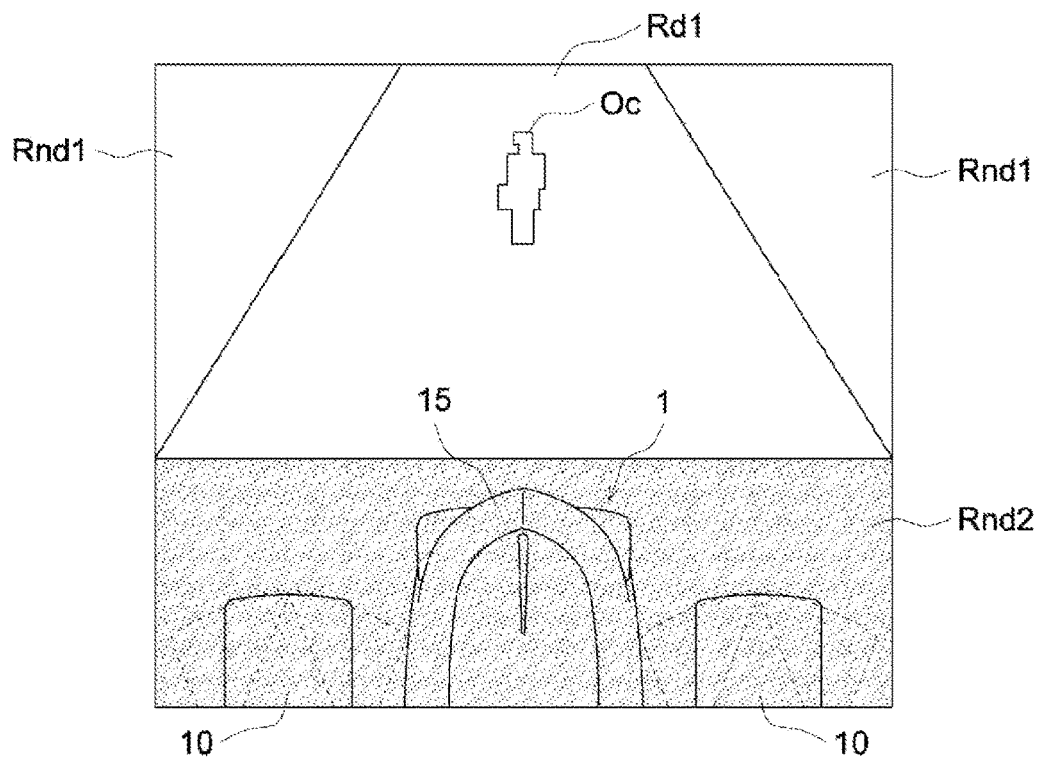
FIG. 18 is a diagram illustrating a distance image of the front LiDAR sensor in an obstacle detected state.

The information integration processing unit 80C performs first determination processing to determine whether or not an obstacle O is detected in the image by the front camera 81 on the basis of the information from the imaging unit 80A (step #11, see FIGS. 14 to 16). FIG. 14 illustrates a state in which no obstacle O is detected in the image by the front camera 81. FIG. 15 illustrates a state in which an obstacle (a person) O is detected in an image by the front camera 81. FIG. 16 illustrates a state in which an obstacle (a person) O is detected in an image from the front camera 81 in a state where the obstacle (a person) O is present among crop or grass.

The information integration processing unit 80C performs second determination processing to determine whether or not an obstacle candidate Oc is included in a distance image by the front LiDAR sensor 86 on the basis of the measurement information from the active sensor unit 80B (step #12).

When the obstacle O (see FIG. 15) is detected in the image by the front camera 81 in the first determination processing and the obstacle candidate Oc (see FIG. 18) is included in the distance image by the front LiDAR sensor 86 in the second determination processing of step #2, the information integration processing unit 80C performs third determination processing to determine whether or not the position of the above-described obstacle O and the position of the obstacle candidate Oc match (step #13).

When the position of the obstacle O and the position of the obstacle candidate Oc match, the information integration processing unit 80C performs proper state confirmation processing to confirm that the detection state of the obstacle O (the obstacle candidate Oc) by the front camera 81 and the front LiDAR sensor 86 is a proper detection state in which both of them properly detect the same obstacle O (the obstacle candidate Oc) (step #14). The information integration processing unit 80C then performs proper information output processing to output proper obstacle detection information that applies the distance information of the obstacle candidate Oc measured by the front LiDAR sensor 86 to the obstacle O detected in the image by the front camera 81 (step #15).

If the position of the obstacle O and the position of the obstacle candidate Oc do not match, the information integration processing unit 80C performs fourth determination processing to determine whether or not the measured value of the position corresponding to the position of the obstacle O in the image by the front camera 81 is valid in the distance information of the obstacle candidate Oc (step #16).

Figure 19:
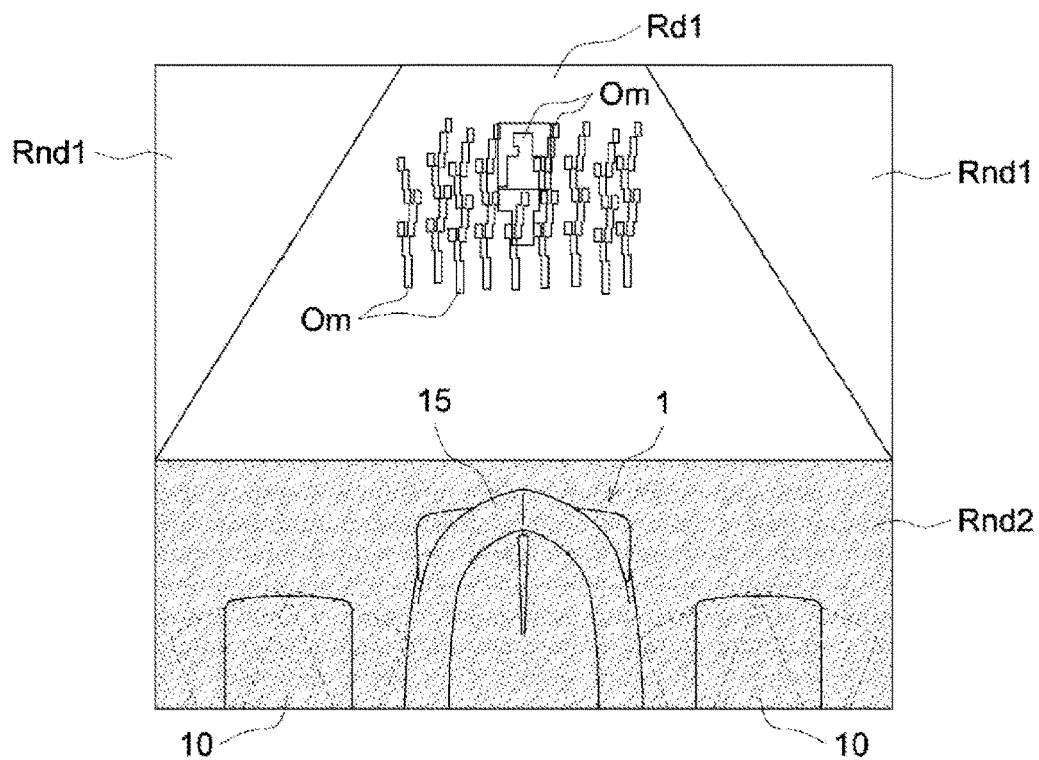
FIG. 19 is a diagram illustrating a distance image of the front LiDAR sensor in an obstacle detected state.

If the measured value described above is valid in the fourth determination processing, the information integration processing unit 80C performs quasi-proper state confirmation processing (step #17). In the quasi-proper state confirmation processing, the detection state of the obstacle O (obstacle candidate Oc) by the front camera 81 and the front LiDAR sensor 86 is confirmed to be a quasi-proper detection state in which the obstacle O is properly detected in the image by the front camera 81 and the measurement by the front LiDAR sensor 86 is properly performed, but the obstacle cannot be identified as the obstacle candidate Oc in the distance image by the front LiDAR sensor 86 because the most of the obstacle (a person) is blended in the surrounding crops and grasses, etc., as illustrated in FIG. 19. Then, the information integration processing unit 80C performs quasi-proper information output processing to output the obstacle detection information that applies the distance information on measurement targets Om corresponding to the position of the obstacle O indicated by the front camera 81 (the measurement targets (person) Om surrounded by rectangular frames in FIG. 19) measured by the front LiDAR sensor 86 to the obstacle O detected in the image by the front camera 81 (see FIG. 16) (Step #18). In this way, in the quasi-proper information output processing, the distance information of the measurement target Om located in the surrounding of the obstacle O is output.

Figure 20:
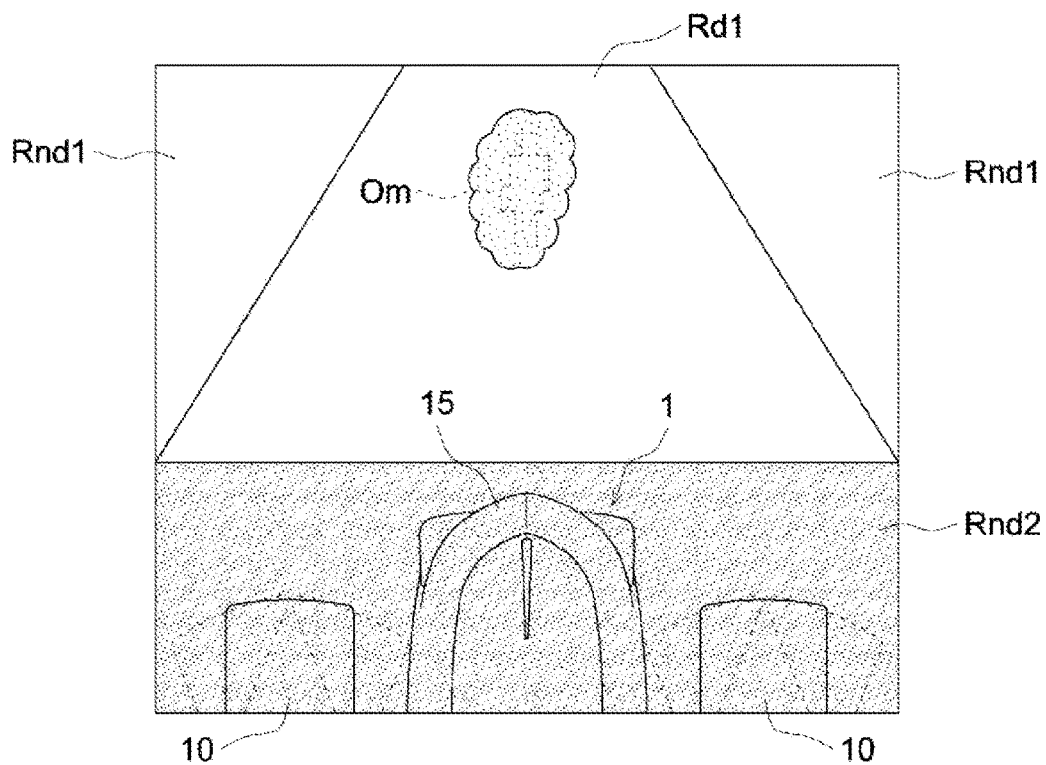
FIG. 20 is a diagram illustrating a distance image of the front LiDAR sensor in an obstacle undetected state caused by a measurement inhibiter.
Figure 21:
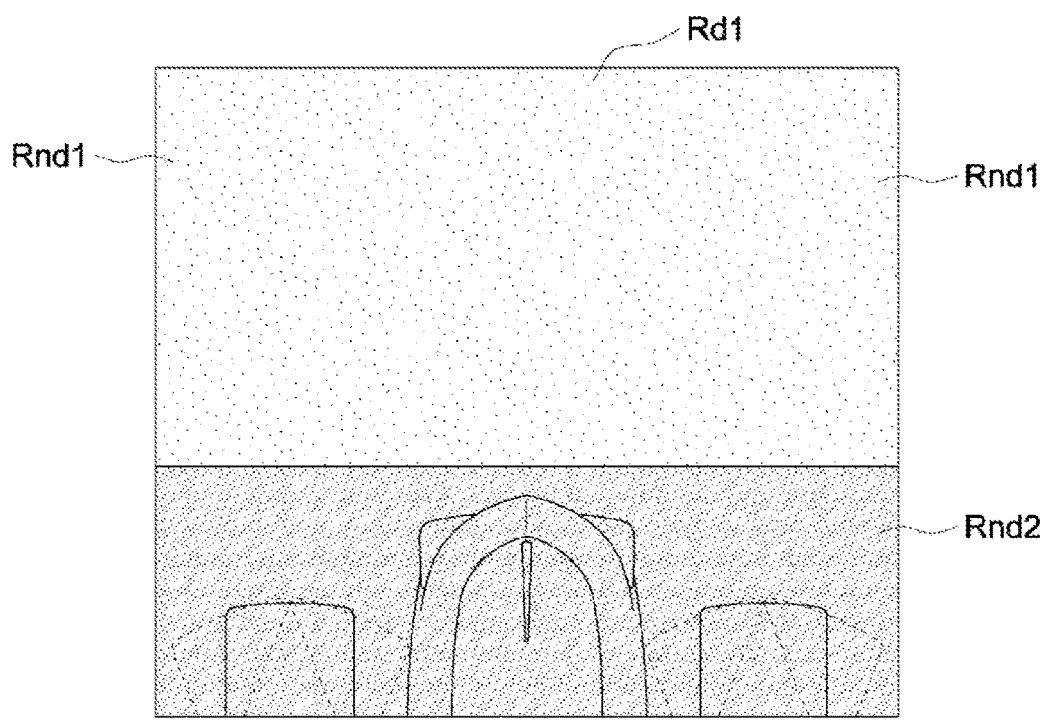
FIG. 21 is a diagram illustrating a distance image of the front LiDAR sensor in an obstacle undetected state caused by a measurement inhibiter.

If the measured value described above is not valid in the fourth determination processing, the information integration processing unit 80C performs single detection state confirmation processing (step #19). In the single detection state confirmation processing, the detection state of the obstacle O (the obstacle candidate Oc) by the front camera 81 and the front LiDAR sensor 86 is confirmed to be a single detection state by the front camera 81 because the obstacle O is properly detected in the image by the front camera 81, but in the distance image by the front LiDAR sensor 86, the measured value for the measurement target Om corresponding to the position of the obstacle O indicated by the front camera 81 is invalid because of, for example, the occurrence of floating matter such as dust or fog at the measurement target position corresponding to the position of the obstacle O indicated by the front camera 81 as illustrated in FIG. 20, or the adhesion of dirt on the sensor surface of the front LiDAR sensor 86. Then, the information integration processing unit 80C performs camera information output processing to output the obstacle detection information that applies the distance information of the obstacle O calculated from the image by the front camera 81 to the obstacle O detected in the image by the front camera 81 (see FIG. 16) (step #20).

The automatic travel control section 23F executes collision avoidance control to avoid a collision with an obstacle on the basis of the obstacle detection information from the information integration processing unit 80C. Specifically, when the obstacle detection information of the proper information output processing or the quasi-proper information output processing is acquired from the information integration processing unit 80C, the automatic travel control section 23F executes the first collision avoidance control as the collision avoidance control. If the obstacle detection information of the camera information output processing is acquired from the information integration processing unit 80C, the automatic travel control section 23F executes, as the collision avoidance control, second collision avoidance control having a higher collision avoidance rate than the first collision avoidance control.

Figure 22:
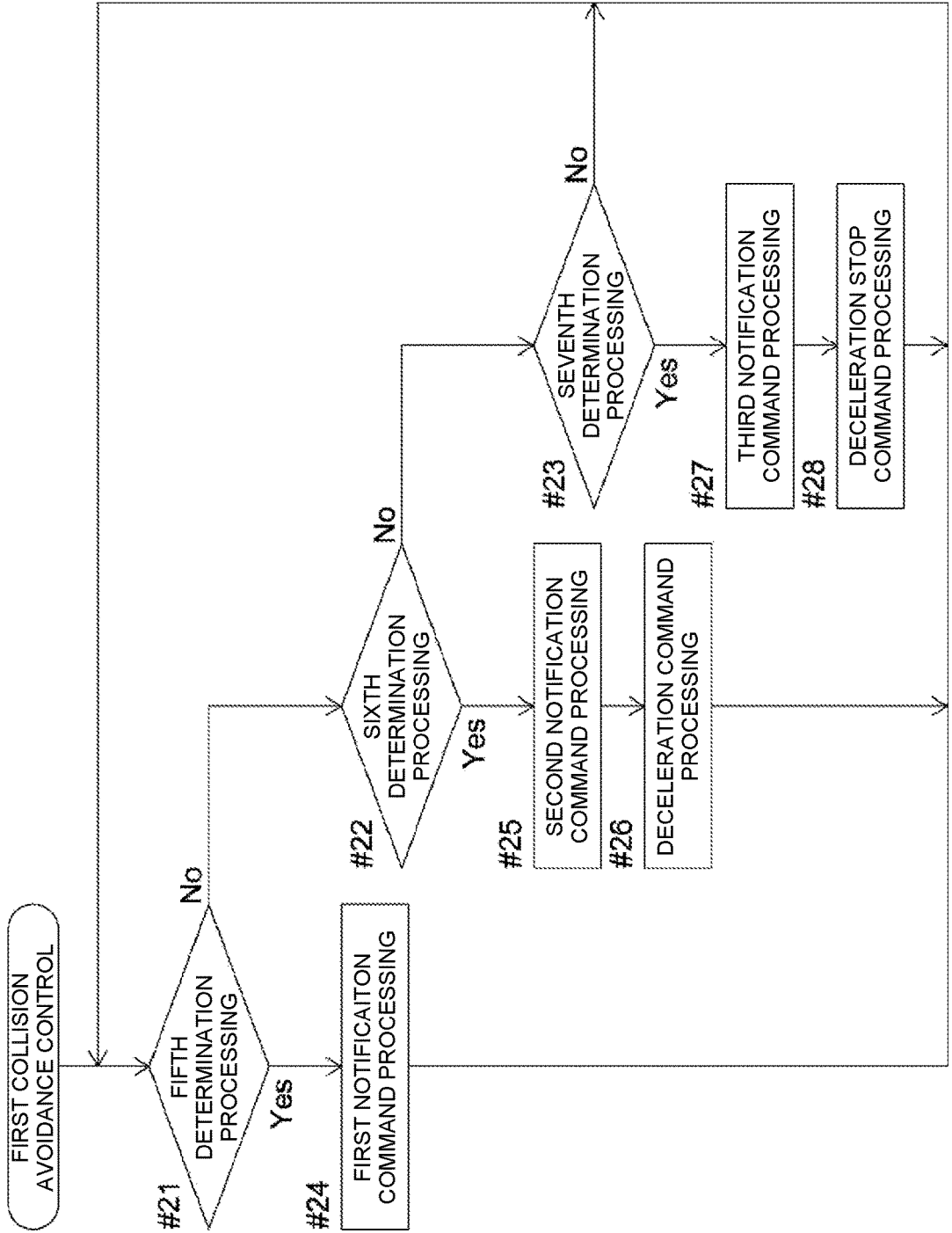
FIG. 22 is a flowchart illustrating a processing procedure of an automatic travel control unit in first collision avoidance control.

Hereinafter, the control actuation of the automatic travel control section 23F in the first collision avoidance control will be explained, based on the flowchart illustrated in FIG. 22. Here, the case where an obstacle is located in the first detection range Rd1 of the front LiDAR sensor 86 will be illustrated by way of example.

The automatic travel control section 23F performs, on the basis of the distance from the obstacle included in the obstacle detection information, fifth determination processing to determine whether or not the obstacle is located in the notification control range Rnc in the first detection range Rd1 illustrated in FIG. 4, sixth determination processing to determine whether or not the obstacle is located in the deceleration control range Rdc, and seventh determination processing to determine whether or not the obstacle is located in the stop control range Rsc (steps #21 to #23). Here, for the distance from the obstacle included in the obstacle detection information, the distance from the obstacle output in the proper information output processing is the distance information of the obstacle candidate Oc measured by the front LiDAR sensor 86. In contrast, the distance from the obstacle output in the quasi-proper information output processing is the distance information of the measurement target Om located in the surroundings of the obstacle O measured by the front LiDAR sensor 86.

If an obstacle is detected to be located in the notification control range Rnc of the first detection range Rd1 in the fifth determination processing, the automatic travel control section 23F performs first notification command processing to issue a notification command for notifying about the obstacle being located in the notification control range Rnc on the liquid crystal monitor 27 of the tractor 1 or the display device 50 of the mobile communication terminal 5 to the display control section 23E of the in-vehicle control unit 23 and the display control section 51A of the terminal control unit 51 (step #24). In this way, it is possible to notify the user, such as the occupant in the driving unit 12 or the administrator on the outside of the vehicle, of the presence of the obstacle in the notification control range Rnc of the first detection range Rd1 for the tractor 1.

If the obstacle is detected to be located in the deceleration control range Rdc of the first detection range Rd1 in the sixth determination processing, the automatic travel control section 23F performs second notification command processing to issue a notification command for notifying about the obstacle being located in the deceleration control range Rdc on the liquid crystal monitor 27 of the tractor 1 or the display device 50 of the mobile communication terminal 5 to the display control section 23E of the in-vehicle control unit 23 and the display control section 51A of the terminal control unit 51 (step #25). In addition, the automatic travel control section 23F performs deceleration command processing to issue a deceleration command for decreasing the vehicle speed of the tractor 1 as the obstacle located in the deceleration control range Rdc approaches the tractor 1, to the vehicle speed control section 23B (step #26). In this way, it is possible to notify the user, such as the occupant in the driving unit 12 or the administrator on the outside of the vehicle, of the presence of the obstacle in the deceleration control range Rdc of the first detection range Rd1 for the tractor 1. In addition, by the control actuation of the vehicle speed control section 23B, the vehicle speed of the tractor 1 can be appropriately reduced as the tractor 1 approaches the obstacle.

If an obstacle is detected to be located in the stop control range Rsc of the first detection range Rd1 in the seventh determination processing, the automatic travel control section 23F performs third notification command processing to issue a notification command for notifying about the obstacle being located in the stop control range Rsc on the liquid crystal monitor 27 of the tractor 1 or the display device 50 of the mobile communication terminal 5 to the display control section 23E of the in-vehicle control unit 23 and the display control section 51A of the terminal control unit 51 (step #27). In addition, the automatic travel control section 23F performs deceleration stop command processing to issue a deceleration stop command for decelerating the tractor 1 to a stop while the obstacle is located in the stop control range Rsc, to the vehicle speed control section 23B (step #28). In this way, it is possible to notify the user, such as the occupant in the driving unit 12 or the administrator on the outside of the vehicle, of the presence of the obstacle in the stop control range Rsc of the first detection range Rd1 for the tractor 1. Also, by the control actuation of the vehicle speed control section 23B, the tractor 1 can be decelerated to a stop while the obstacle is located in the stop control range Rsc, thus the risk of the tractor 1 colliding with the obstacle can be avoided.

Next, to explain the control actuation of the automatic travel control section 23F in the second collision avoidance control, the automatic travel control section 23F performs the control processing that is the same as steps #21 to #28 of the control processing in the first collision avoidance control while the front and rear lengths of the deceleration control range Rdc and the stop control range Rsc are increased so that the distance from the determination reference position of the first detection range Rd1 described above to the boundary between the deceleration control range Rdc and the stop control range Rsc and the distance from the determination reference position to the boundary between the notification control range Rnc and the deceleration control range Rdc are longer than in the first collision avoidance control described above. Accordingly, the second collision avoidance control is collision avoidance control to avoid a collision with an obstacle at an earlier timing than that in the first collision avoidance control.

In this way, the automatic travel control section 23F avoids a collision with the obstacle with a higher collision avoidance rate than the first collision avoidance control in the second collision avoidance control in which a collision with the obstacle is avoided on the basis of the measurement information from the imaging unit 80A, which has lower ranging accuracy than the measurement information from the active sensor unit 80B. As a result, avoidance of a collision with an obstacle can be performed well on the basis of the measurement information from the imaging unit 80A having low ranging accuracy.

The automatic travel control of the automatic travel control section 23F includes dirt adhesion determination processing that stops the automatic travel of the tractor 1 when dirt adhesion is detected on the sensor surfaces of the respective LiDAR sensors 86 and 87.

Figure 23:
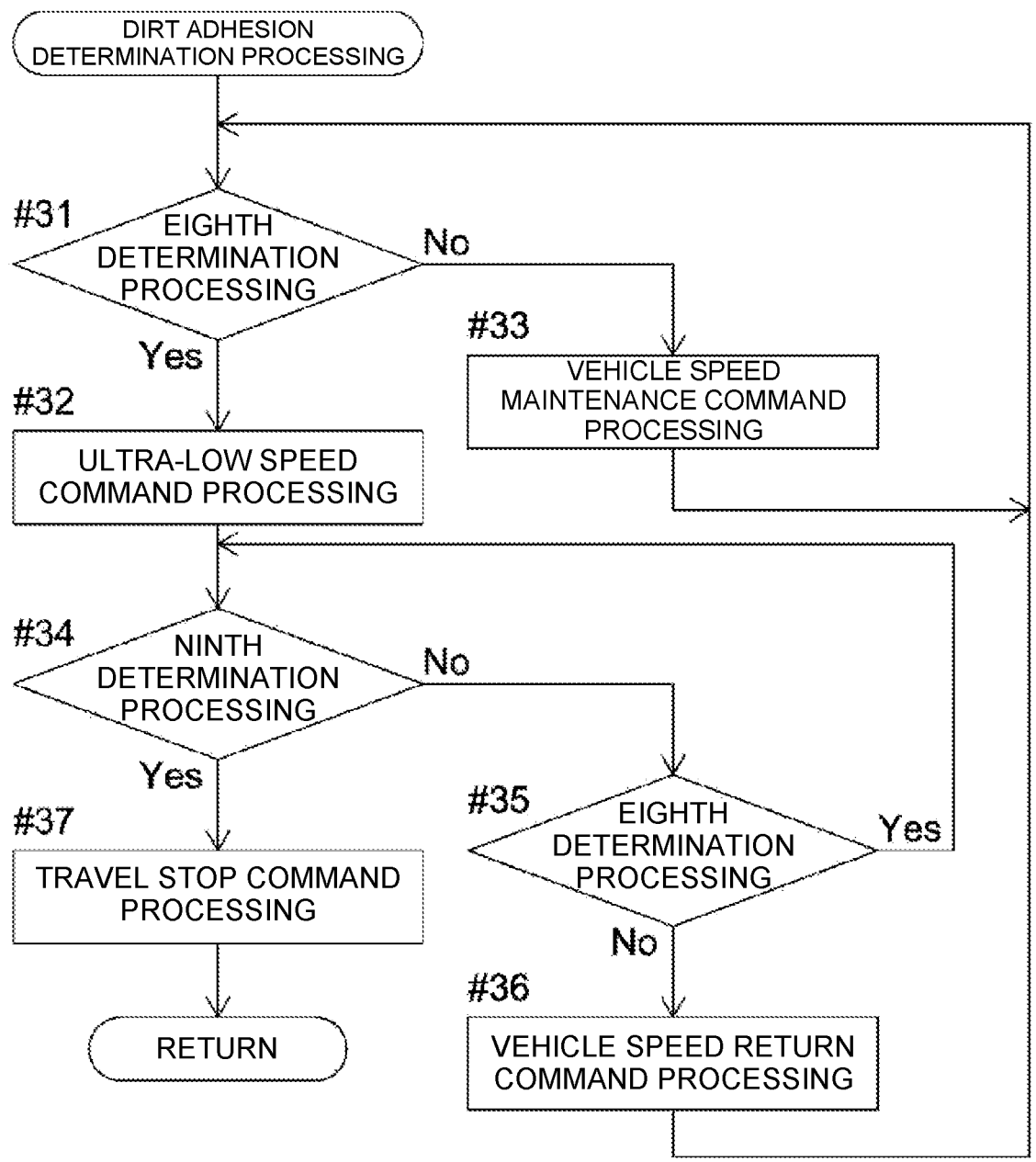
FIG. 23 is dirt adhesion determination. The flowchart illustrates a processing procedure by the automatic travel control unit in control.

A description will hereinafter be made on control actuation of the automatic travel control section 23F in the dirt (measurement inhibiter) adhesion determination processing on the basis of the flowchart illustrated in FIG. 23. Here, the case of the front LiDAR sensor 86 will be illustrated by way of example.

The automatic travel control section 23F performs eighth determination processing to determine whether or not the ratio of invalid values caused by measurement inhibiters, such as dirt, included in the measurement information from the front LiDAR sensor 86 for the measurement range Rm1 of the LiDAR sensor 86 is 50% or more (step #31).

If the ratio of invalid values is 50% or more in the eighth determination processing (if a predetermined condition for dirt adhesion determination set in advance is satisfied), the automatic travel control section 23F performs ultra-deceleration command processing to issue an ultra-deceleration command, to the vehicle speed control section 23B, for lowering the vehicle speed of the tractor 1 to an ultra-low speed that enables the tractor 1 to maintain the ultra-low speed traveling state (step #32).

If the ratio of the invalid values is not 50% or more in the eighth determination processing, the automatic travel control section 23F performs vehicle-speed maintenance command processing to issue a vehicle speed maintenance command for maintaining the vehicle speed of the tractor 1 at the current vehicle speed, to the vehicle speed control section 23B (step #33).

After the ultra-deceleration command processing, the automatic travel control section 23F performs ninth determination processing to determine whether or not the ultra-low speed traveling state of the tractor 1 has continued for a predetermined time (step #34). Then, if the eighth determination processing described above is performed while the ultra-low speed traveling state continues for a predetermined time (step #35), and the ratio of the invalid values decreases to less than 50% in the eighth determination processing, the automatic travel control section 23F determines that there is no dirt adhering to the sensor surface of the front LiDAR sensor 86, but only floating matter, such as dust or fog, in the surroundings of the front LiDAR sensor 86 have been floating, and performs vehicle-speed return command processing to issue, to the vehicle speed control section 23B, a vehicle speed return command for returning the vehicle speed of the tractor 1 to the original vehicle speed before the vehicle speed is decreased to the ultra-low speed (step #36). Then, the processing return to step #31.

If the ultra-low speed traveling state is continued for a predetermined time, the automatic travel control section 23F determines that dirt is adhering to the sensor surface of the front LiDAR sensor 86, and immediately performs traveling stop command processing to issue a traveling stop command for stopping the traveling of the tractor 1, to the vehicle speed control section 23B (step #37).

With the above-described configuration, in the case where the tractor 1 is automatically traveling under the automatic travel control of the automatic travel control section 23F, when the obstacle detection unit 80 detects an obstacle from the information of the respective cameras 81 to 84 and acquires a separation distance from the obstacle from the information of the front and rear LiDAR sensors 86 and 87 or the sonar 88, the automatic travel control section 23F executes the first collision avoidance control to avoid a collision between the tractor 1 and the obstacle on basis of the separation distance from the obstacle acquired from the information of the front and rear LiDAR sensors 86 and 87 or the sonar 88.

In other words, the obstacle detection unit 80 can accurately detect a person, a tree, or the like existing in the work area as an obstacle from the information of each of the cameras 81 to 84 with high object discrimination accuracy. In addition, the obstacle detection unit 80 can acquire the separation distance from the detected obstacle, such as a person or a tree, with high accuracy from the information of the front and rear LiDAR sensors 86 and 87 or the sonar 88 with high ranging accuracy. In this way, the obstacle detection unit 80 enters a proper detection state described above. Then, the automatic travel control section 23F can accurately avoid the risk of the tractor 1 colliding with obstacles on basis of the separation distance from the obstacles such as persons and trees with high accuracy acquired from the information of the front and rear LiDAR sensors 86 and 87 or the sonar 88.

As a result, the obstacle can be detected accurately, and the tractor 1 can accurately avoid collision with the obstacle without performing an unnecessary collision avoidance operation.

In addition, when the obstacle detection unit 80 detects an obstacle from the information of the respective cameras 81 to 84 but cannot acquire the separation distance from the obstacle from the front and rear LiDAR sensors 86 and 87 or the sonar 88 (the single detection state described above), the automatic travel control section 23F executes the second collision avoidance control, which has a higher collision avoidance rate than the first collision avoidance control, on the basis of the separation distance from the obstacle acquired from the information of the respective cameras 81 to 84.

In this way, even when the separation distance from the obstacle cannot be acquired from the information of the respective LiDAR sensors 86 and 87 or the like due to, for example, the adhering of a measurement inhibiter, such as dirt, to the sensor surfaces of the respective LiDAR sensors 86 and 87 or the floating of a measurement inhibiter, such as dust or dirt, in the surrounding of the respective LiDAR sensors 86 and 87, the automatic travel control section 23F can avoid the risk of the tractor 1 colliding with the obstacle on basis of the separation distance from the obstacle acquired from the information of the respective cameras 81 to 84.

Since the separation distance from the obstacle acquired from the information of the respective cameras 81 to 84 is less accurate than the separation distance from the obstacle acquired from the information of the respective LiDAR sensors 86 and 87 or the sonar 88, the automatic travel control section 23F can execute the second collision avoidance control, which has a higher collision avoidance rate than the first collision avoidance control, to satisfactorily avoid the risk of the tractor 1 colliding with the obstacle while compensating for a decrease in the ranging accuracy.

Furthermore, when the obstacle detection unit 80 detects an obstacle from the information of the respective cameras 81 to 84, but cannot acquire the separation distance from the obstacle from the front and rear LiDAR sensors 86 and 87 or the sonar 88 while acquiring the separation distance from the obstacle surroundings (the quasi-proper detection state described above), the automatic travel control section 23F executes the first collision avoidance control on the basis of the separation distance from the obstacle surroundings acquired by the obstacle detection unit 80.

In this way, when the respective LiDAR sensors 86 and 87 or the sonar 88 cannot measure the distance from the obstacle because, for example, the obstacle detected from the information of the respective cameras 81 to 84 is blended in the surrounding grasses or the like, and measures the distance from measurement target such as the grass located in the surroundings of the obstacle, the automatic travel control section 23F can avoid the risk of the tractor 1 colliding with the obstacle on the basis of the separation distance from the measurement target in the surroundings of the obstacle that is substantially the same as the separation distance from the obstacle. As a result, the risk of the tractor 1 colliding with the obstacle can be avoided with relatively high accuracy.

Besides, when the adhesion rate of the measurement inhibitor, such as dirt, to the surfaces of the sensors, such as the LiDAR sensors 86 and 87, (the ratio of the invalid values caused by the measurement inhibitor, such as dirt) satisfies the predetermined condition (50% or more), the automatic travel control section 23F continues for a predetermined time the ultra-low speed traveling state in which the vehicle speed of the tractor 1 is lowered to an ultra-low speed state. If the adhesion rate no longer satisfies the predetermined condition before the predetermined time elapses, the automatic travel control section 23F returns to the vehicle speed of the tractor 1 from the ultra-low speed state to the original speed, or if the adhesion rate continues to satisfy the predetermined condition until the predetermined time elapses, the automatic travel of the tractor 1 is stopped.

In this way, the automatic travel of the tractor 1 is not simply stopped when the adhesion rate of the measurement inhibiter to the sensor surfaces of the respective LiDAR sensors 86 and 87 or the sonar 88 satisfies the predetermined condition, but by adding the condition that the state in which the adhesion rate satisfies the predetermined condition continues for a predetermined time, it can be determined whether the measurement inhibiter satisfying the predetermined condition is an adherent such as dirt on the sensor surfaces or a floating matter such as dust or dirt that is floating in the surroundings of the respective LiDAR sensors 86 and 87 or the sonar 88, and the traveling of the tractor 1 can be controlled in accordance with the determined result.

Moreover, since the tractor 1 travel at an ultra-low speed until the predetermined time elapses after the adhesion rate satisfies the predetermined condition, the predetermined time after the adhesion rate satisfies the predetermined condition, that is, the time for determining whether or not it is an adherent, can be prolonged compared with the case where the tractor 1 simply travels at a low speed. In this way, it is possible to suppress the occurrence of the inconvenience of stopping the tractor 1 when the measurement inhibiter satisfying the predetermined conditions is a floating matter such as dust or dirt.

By causing the tractor 1 to travel at an ultra-low speed traveling state, it is possible to suppress the occurrence of the inconvenience of the tractor 1 colliding with an obstacle during the determination of whether or not the obstacle is an adherent.

OTHER EMBODIMENTS

A description will be made on other embodiments of the present invention. Note that a configuration of each of the other embodiments described below can be applied not only independently but can also be applied in combination with the configuration of another embodiment.

(1) A configuration of a work vehicle can be changed in various ways. For example, the work vehicle may be configured to have a semi-crawler specification that includes left and right crawlers instead of the left and right rear wheels 11. For example, the work vehicle may be configured to have a full-crawler specification that includes the left and right crawlers instead of the left and right front wheels 10 and the left and right rear wheels 11. For example, the work vehicle may be configured to have an electric specification that includes an electric motor instead of the engine 14. For example, the work vehicle may be configured to have a hybrid specification that includes the engine 14 and the electric motor for travel.

(2) As the active sensors 86 to 88, radar sensors may be adopted instead of the LiDAR sensors 86 and 87 and the sonar 88. Alternatively, LiDAR sensors may be adopted for all of the active sensors 86 to 88.

(3) The active sensors 86 to 88 may be configured to measure the distance to the obstacle when the image processing device 85 detects an obstacle in any of the measurement ranges Rm1 to Rm4 of the active sensors 86 to 88.

With this configuration, the active sensors 86 to 88 do not have to constantly make the measurements in the measurement ranges Rm1 to Rm4 thereof, and make the measurements only when the image processing device 85 detects an obstacle in any of the measurement ranges Rm1 to Rm4. Thus, it is possible to improve accuracy of the distance measurement for the obstacle while reducing the load required for the distance measurement.

(4) A stereo camera or the like may be adopted for the imaging units 81 to 84. In addition, as the imaging units 81 to 84, a front camera that has a different angle of view from the front camera 81 may be provided in addition to the front camera 81, the rear camera 82, the right camera 83, and the left camera 84.

ADDENDUM OF THE INVENTION

A first characteristic configuration of the present invention is, in an automatic travel system for a work vehicle including: an automatic travel control unit that causes the work vehicle to automatically travel, the work vehicle including an obstacle detection unit that detects obstacles, wherein, the obstacle detection unit includes an imaging unit that image-captures a set range in a predetermined direction from the work vehicle, and an active sensor that measures a set range in the same predetermined direction as the imaging unit from the work vehicle; when the obstacle detection unit detects the obstacle from the information of the imaging unit and acquires a separation distance from the obstacle from the information of the active sensor, the automatic travel control unit executes first collision avoidance control to avoid a collision between the work vehicle and the obstacle on the basis of the separation distance from the obstacle acquired from the information of the active sensor.

According to this configuration, the obstacle detection unit can accurately detect a person, a tree, or the like existing in a work area as an obstacle from information of the imaging unit with high object discrimination accuracy. The obstacle detection unit can acquire the separation distance from the detected obstacle, such as a person or a tree, with high accuracy from the information of the active sensor with high ranging accuracy. Then, the automatic travel control unit can accurately avoid the risk of the work vehicle colliding with the obstacle, such as a person or a tree, on the basis of the separation distance from the obstacle with high accuracy acquired from the information of the active sensors.

As result, an automatic travel system can be provided for a work vehicle that can accurately detect an obstacle and avoid a collision between the work vehicle and the obstacle without the work vehicle having to perform unnecessary collision avoidance operations.

In a second characteristic configuration, when the obstacle detection unit detects the obstacle from the information of the imaging unit but cannot acquire the separation distance from the obstacle from the information of the active sensor, the automatic travel control unit executes second collision avoidance control on the basis of the separation distance from the obstacle acquired from the information of the imaging unit, the second collision avoidance control having a higher collision avoidance rate than the first collision avoidance control.

According to this configuration, even when the separation distance from the obstacle cannot be acquired from the information of the active sensor due to, for example, the adhering of a measurement inhibiter, such as dirt, to the sensor surface of the active sensor or the floating of a measurement inhibiter, such as dust or dirt, in the surrounding of the active sensor, the automatic travel control unit can avoid the risk of the work vehicle colliding with the obstacle on basis of the separation distance from the obstacle acquired from the information of the imaging unit.

Since the separation distance from the obstacle acquired from the information of the imaging unit is less accurate than the separation distance from the obstacle acquired from the information of the active sensor, the automatic travel control unit can execute the second collision avoidance control, which has a higher collision avoidance rate than the first collision avoidance control, to satisfactorily avoid the risk of the work vehicle colliding with the obstacle while compensating for a decrease in the ranging accuracy.

The collision avoidance rate can be increased, for example, by increasing the separation distance from the obstacle at which the work vehicle starts to decelerate or stop, or by lowering the vehicle speed at the time of collision avoidance.

In a third characteristic configuration, when the obstacle detection unit detects the obstacle from the information of the imaging unit but cannot acquire the separation distance from the obstacle from information of the active sensor while acquiring the separation distance from the obstacle surroundings, the automatic travel control unit executes the first collision avoidance control on the basis of the separation distance from the obstacle surroundings acquired by the active sensor.

According to this configuration, when the active sensor cannot measure the distance from the obstacle because, for example, the obstacle detected from the information of the imaging unit is blended in the surrounding grasses or the like, and measures the distance from measurement target such as the grass located in the surroundings of the obstacle, the automatic travel control unit can avoid the risk of the work vehicle colliding with the obstacle on the basis of the separation distance from the measurement target in the surroundings of the obstacle that is substantially the same as the separation distance from the obstacle. In this way, the risk of the work vehicle colliding with an obstacle can be avoided with relatively high accuracy.

In a fourth characteristic configuration, when the adhesion rate of the measurement inhibiter to the active sensor satisfies a predetermined condition, the automatic travel control unit continues for a predetermined time the ultra-low speed traveling state in which the vehicle speed of the work vehicle is reduced to an ultra-low speed state, and when the adhesion rate no longer satisfies the predetermined condition until the predetermined time elapses, the automatic travel control unit returns the vehicle speed of the work vehicle from the ultra-low speed state to the original vehicle speed. In contrast, when the adhesion rate continues to satisfy the predetermined condition until the predetermined time elapses, the automatic traveling of the work vehicle is stopped.

According to this configuration, the automatic travel of the work vehicle is not simply stopped when the adhesion rate of the measurement inhibiter to the active sensor satisfies the predetermined condition, but by adding the condition that the state in which the adhesion rate satisfies the predetermined condition continues for a predetermined time, it can be determined whether the measurement inhibiter satisfying the predetermined condition is an adherent such as dirt on the active sensor or a floating matter such as dust or dirt that is floating in the surroundings of the active sensor, and the traveling of the work vehicle can be controlled in accordance with the determined result.

Moreover, since the work vehicle travels at an ultra-low speed traveling state until the predetermined time elapses after the adhesion rate satisfies the predetermined condition, the predetermined time after the adhesion rate satisfies the predetermined condition, that is, the time for determining whether or not the measurement inhibitor is an adherent, can be lengthened compared with the case where the work vehicle simply travels at a low speed. In this way, it is possible to suppress the occurrence of the inconvenience of stopping the work vehicle when the measurement inhibiter satisfying the predetermined conditions is a floating matter such as dust or dirt.

By causing the work vehicle to travel at an ultra-low speed traveling state, it is possible to suppress the occurrence of the inconvenience of the work vehicle colliding with an obstacle during the determination of whether or not the obstacle is an adherent.

The invention claimed is:

1. An automatic travel system for a work vehicle, comprising:
    an automatic travel control unit that causes the work vehicle to automatically travel, the work vehicle including an obstacle detection unit that detects obstacles, wherein
    the obstacle detection unit includes an imaging unit that image-captures a set range in a predetermined direction from the work vehicle, and an active sensor that measures a set range in the same predetermined direction as the imaging unit from the work vehicle,
    when the obstacle detection unit detects the obstacle from information of the imaging unit and acquires a separation distance from the obstacle from information of the active sensor, the automatic travel control unit executes first collision avoidance control to avoid a collision between the work vehicle and the obstacle on the basis of the separation distance from the obstacle acquired from the information of the active sensor, and
    when the obstacle detection unit detects the obstacle from the information of the imaging unit but is not able to acquire the separation distance from the obstacle from the information of the active sensor, the automatic travel control unit executes second collision avoidance control on the basis of the separation distance from the obstacle acquired solely from the information of the imaging unit, the second collision avoidance control having a collision avoidance rate higher than the first collision avoidance control.

2. The automatic travel system for a work vehicle according to claim 1, wherein when the obstacle detection unit detects the obstacle from the information of the imaging unit but is not able to acquire the separation distance from the obstacle from the information of the active sensor while having acquired the separation distance from the obstacle surroundings, the automatic travel control unit executes the first collision avoidance control based on the separation distance from the obstacle surroundings acquired by the active sensor.

3. The automatic travel system for a work vehicle according to claim 1, wherein the automatic travel control unit continues for a predetermined time an ultra-low speed traveling state in which vehicle speed of the work vehicle is reduced to an ultra-low speed state when an adhesion rate of a measurement inhibiter to the active sensor satisfies a predetermined condition, returns the vehicle speed of the work vehicle from the ultra-low speed state to an original vehicle speed when the adhesion rate no longer satisfies the predetermined condition until the predetermined time elapses, and stops automatic traveling of the work vehicle when the adhesion rate continues to satisfy the predetermined condition until the predetermined time elapses.

* * * * *